(12) United States Patent
Mitani et al.

(10) Patent No.: US 7,621,260 B2
(45) Date of Patent: Nov. 24, 2009

(54) INTERNAL COMBUSTION ENGINE AND CONTROL METHOD THEREOF

(75) Inventors: Shinichi Mitani, Susono (JP); Daisaku Sawada, Gotenba (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 259 days.

(21) Appl. No.: 11/817,561

(22) PCT Filed: Sep. 12, 2006

(86) PCT No.: PCT/IB2006/002496

§ 371 (c)(1),
(2), (4) Date: Aug. 31, 2007

(87) PCT Pub. No.: WO2007/031839

PCT Pub. Date: Mar. 22, 2007

(65) Prior Publication Data

US 2008/0245349 A1    Oct. 9, 2008

(30) Foreign Application Priority Data

Sep. 12, 2005    (JP)    ............................. 2005-264226

(51) Int. Cl.
*F02B 43/12*    (2006.01)
(52) U.S. Cl. ............................. 123/527; 123/3; 123/575
(58) Field of Classification Search ................ 123/1 A, 123/3, 527, 575
See application file for complete search history.

(56) References Cited

U.S. PATENT DOCUMENTS

| 4,141,326 | A  |   | 2/1979  | Wolber |
|-----------|----|---|---------|--------|
| 5,787,864 | A  | * | 8/1998  | Collier et al. ............... 123/492 |
| 5,852,927 | A  | * | 12/1998 | Cohn et al. ................... 60/780 |
| 6,405,720 | B1 |   | 6/2002  | Collier et al. |
| 6,651,623 | B1 |   | 11/2003 | Tang et al. |
| 7,316,218 | B2 | * | 1/2008  | Ito .............................. 123/431 |

FOREIGN PATENT DOCUMENTS

| JP | 2 11826    | 1/1990 |
| JP | 4 86329    | 3/1992 |
| JP | 11 93681   | 4/1999 |
| WO | 2006 013870 | 2/2006 |

\* cited by examiner

*Primary Examiner*—Erick Solis
(74) *Attorney, Agent, or Firm*—Oblon, Spivak, McClelland, Maier & Neustadt, L.L.P.

(57) ABSTRACT

An operating gas circulation type internal combustion engine that uses argon as the operating gas, for example, and includes a hydrogen and oxygen supply portion, an argon supply amount regulating portion, and an electric control unit. The electric control unit determines the amount of hydrogen and oxygen to be supplied to a combustion chamber based on a required torque, which is the torque required of the internal combustion engine, and supplies the determined amounts of hydrogen and oxygen to the combustion chamber using the hydrogen supply portion and the oxygen supply portion. Further, the electric control unit determines an amount of operating gas to be supplied to the combustion chamber according to the required torque, and controls the argon supply amount regulating portion such that the determined amount of operating gas is supplied to the combustion chamber.

15 Claims, 16 Drawing Sheets

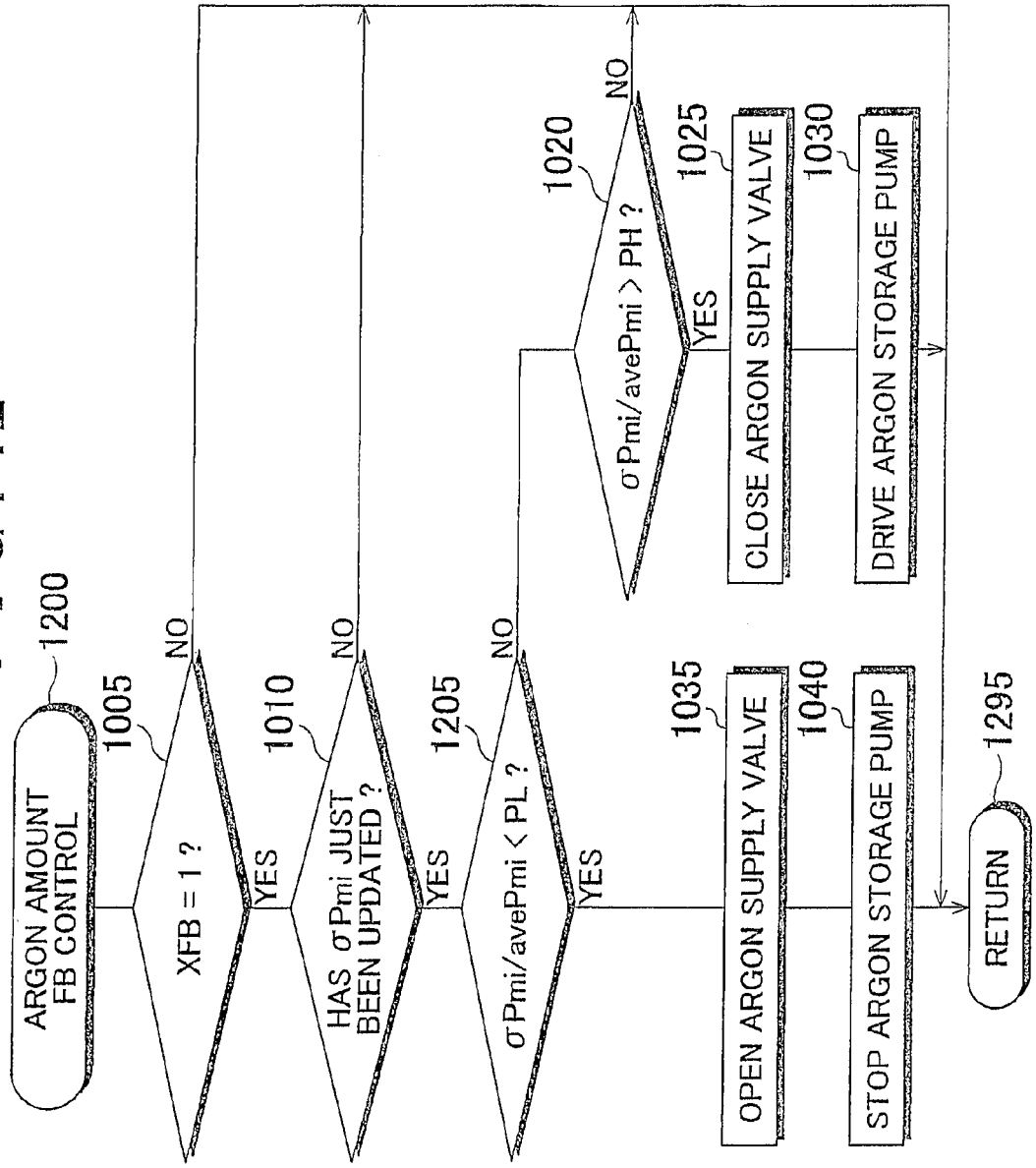
F I G . 12

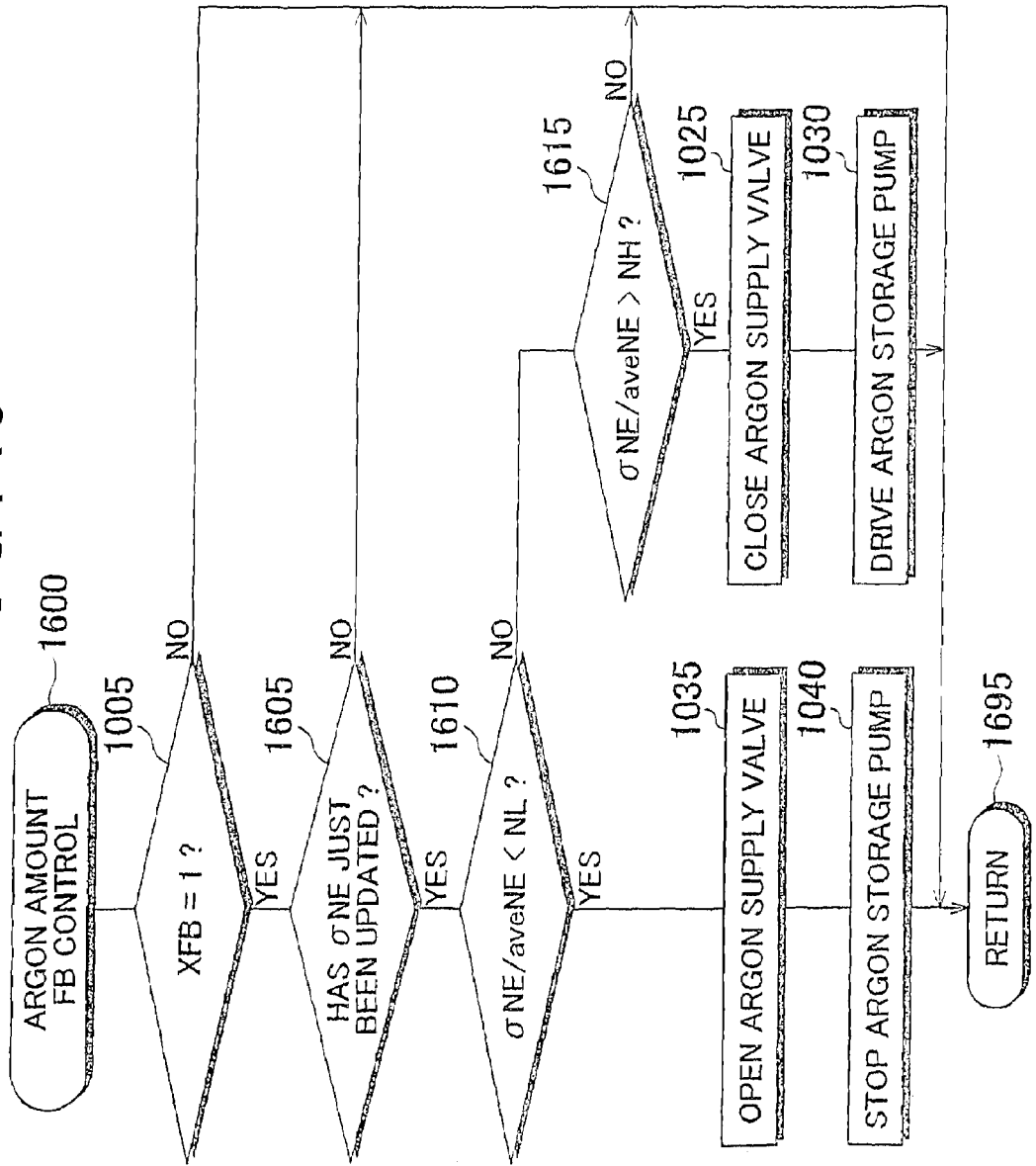

INTERNAL COMBUSTION ENGINE AND CONTROL METHOD THEREOF

FIELD OF THE INVENTION

The invention relates to an operating gas circulation type internal combustion engine (i.e., a closed cycle engine) which combusts hydrogen in a combustion chamber, generates power by expanding an operating gas using heat generated by that combustion, and supplies operating gas in post-combustion gas that has been discharged from the combustion chamber into the combustion chamber again. The invention also relates to a control method of that internal combustion engine.

BACKGROUND OF THE INVENTION

An operating gas circulation type internal combustion engine is known which uses an inert gas such as argon as the operating gas (i.e., heat medium), combusts hydrogen in a combustion chamber, condenses water vapor in the exhaust gas and discharges it outside the system, and supplies the exhaust gas from which the water vapor was removed (i.e., the inert gas) to the combustion chamber again. Japanese Patent Application Publication No. JP-A-11-93681 describes an internal combustion engine which supplies oxygen gas including argon as an impure gas from an oxygen supply apparatus to a combustion chamber via an intake port and injects hydrogen into the combustion chamber. Moreover, this internal combustion engine is structured discharge some of the exhaust gas from which water vapor has been removed through condensation outside the system so as to discharge argon of an amount equivalent to the amount of argon supplied into the system as well as oxygen from the oxygen supply apparatus out of the system. Accordingly, the concentration of argon in the gas supplied to the combustion chamber via the intake port is able to constantly be maintained at a substantially fixed concentration.

If the operating state of the internal combustion engine (for example, the load expressed by the operating amount of the accelerator pedal) changes such that the torque required from the internal combustion engine (hereinafter simply referred to as "required torque") changes, the amount of hydrogen to be combusted in the combustion chamber changes. As a result, the amount of oxygen supplied to the combustion chamber also changes.

Therefore; the inventors researched the change in thermal efficiency of the internal combustion engine when the amounts of hydrogen and oxygen are changed while the amount (i.e., the flowrate) of argon is kept constant in a gas of hydrogen, oxygen, and argon as the operating gas supplied to the combustion chamber (hereinafter this gas will be referred to as "mixed gas") (that is, when the concentration of argon in the mixed gas is changed). FIG. 1 is a graph showing the results.

As can be understood from FIG. 1, maximum thermal efficiency of the internal combustion engine is achieved when the argon concentration in the mixed gas is a value D0. In the range where the argon concentration is less than the value D0 it is estimated that the thermal efficiency decreases because the heat generated by the internal combustion engine is not as easily transmitted to the argon the lower the argon concentration. Also, in the range in which the argon concentration is higher than the value D0 it is estimated that the thermal efficiency decreases because combustion becomes unstable due to the relative decrease in the oxygen concentration in the mixed gas the greater the argon concentration. The value D0 of the argon concentration, which results in the thermal efficiency of the internal combustion engine, fluctuates depending on the amount of heat generated in the combustion chamber and the combustion state. In other words, the value D0 fluctuates according to the amounts of hydrogen and oxygen supplied to the combustion chamber which change according to the required torque. Misfire will occur if the argon concentration exceeds a value D1 (which is greater than D0).

However, the internal combustion engine described above only keeps the ratio of argon to oxygen supplied to the combustion chamber constant regardless of the required torque. Therefore, the argon concentration is unable to be maintained at a value that corresponds to the required torque (i.e., that corresponds to the amounts of hydrogen and oxygen supplied to the combustion chamber). As a result, the thermal efficiency of the internal combustion engine may decrease due to the argon concentration becoming too low, or due to combustion becoming unstable from the argon concentration becoming too high.

DISCLOSURE OF THE INVENTION

A first aspect of the invention therefore relates to an operating gas circulation type internal combustion engine which generates power by combusting hydrogen in a combustion chamber of the internal combustion engine and expanding an operating gas which is an inert gas having a larger specific heat ratio than oxygen using heat generated by that combustion, and supplies operating gas in post-combustion gas discharged from the combustion chamber to the combustion chamber again, which includes hydrogen and oxygen supplying means and operating gas amount regulating means.

In order to have the internal combustion engine generate torque according to the required torque, hydrogen of an amount necessary to generate that torque must be combusted in the combustion chamber. The amount of hydrogen that is combusted in the combustion chamber can be controlled by controlling the amount of either the hydrogen or oxygen supplied to the combustion chamber and regulating the amount of the other so that all of the one that is controlled becomes an amount that is sufficient to combine with the other through combustion. Based on this concept, the foregoing hydrogen and oxygen supplying means determines the respective amounts of the hydrogen and oxygen to be supplied to the combustion chamber so that the internal combustion engine generates torque that corresponds to the required torque, and supplies the determined amounts of hydrogen and oxygen to the combustion chamber. Accordingly, the respective amounts of hydrogen and oxygen to be supplied to the combustion chamber are primarily determined based on the required torque.

On the other hand, the operating gas amount regulating means determines the amount of operating gas to be supplied to the combustion chamber according to the required torque, and regulates the amount of operating gas supplied to the combustion chamber so that the determined amount of operating gas is supplied to the combustion chamber. As a result, even if the amounts of hydrogen and oxygen change due to a change in the required torque, the concentration of the operating gas in the mixed gas which includes hydrogen, oxygen, and the operating gas can be changed to a value that is desirable for the required torque. Therefore, the thermal efficiency of the internal combustion engine can be improved while maintaining a good combustion state.

Also, a second aspect of the invention relates to an operating gas circulation type internal combustion engine which generates power by combusting hydrogen in a combustion chamber of the internal combustion engine and expanding an operating gas which is an inert gas having a larger specific heat ratio than oxygen using heat generated by that combustion, and supplies operating gas in post-combustion gas discharged from the combustion chamber to the combustion chamber again, which includes hydrogen supplying means, oxygen supplying means, and operating gas amount regulating means.

The hydrogen supplying means determines an amount of hydrogen to be supplied to the combustion chamber based on a required torque which is the torque required of the internal combustion engine, and supplies the determined amount of hydrogen to the combustion chamber. The oxygen supplying means determines an amount of oxygen to be supplied to the combustion chamber based on the determined amount of hydrogen, and supplies the determined amount of oxygen to the combustion chamber. The operating gas amount regulating means determines an amount of operating gas to be supplied to the combustion chamber based on the required torque, and regulates the amount of operating gas supplied to the combustion chamber such that the determined amount of operating gas is supplied to the combustion chamber.

Accordingly, the amounts of hydrogen, oxygen, and operating gas are primarily determined according to the required torque. As a result, even if the amounts of hydrogen and oxygen change due to a change in the required torque, the concentration of operating gas in the mixed gas which includes hydrogen, oxygen, and the operating gas can be changed to a value desirable according to the required torque. Therefore, the thermal efficiency of the internal combustion engine can be improved while maintaining a good combustion state.

In this case, the operating gas amount regulating means can determine the amount of operating gas supplied to the combustion chamber so that the thermal efficiency of the internal combustion engine becomes equal to or greater than a predetermined value (i.e., a value close to the maximum value of the thermal efficiency). As a result, the thermal efficiency of the internal combustion engine can be maintained at a high value regardless of the required torque.

A third aspect of the invention relates to an operating gas circulation type internal combustion engine which generates power by supplying hydrogen, oxygen, and an operating gas which is an inert gas having a larger specific heat ratio than oxygen to a combustion chamber and expanding the operating gas using heat generated by combusting the hydrogen, and supplies operating gas in post-combustion gas discharged from the combustion chamber to the combustion chamber again, which includes combustion state index value obtaining means and operating gas amount regulating means.

The combustion state index value obtaining means obtains a combustion state index value which is a value indicative of the combustion state of the internal combustion engine. This combustion state index value may be, for example, the quotient ($\sigma Pmi/avePmi$), or a reciprocal thereof ($avePmi/\sigma Pmi$), of a value $\sigma Pmi$, which is sum of the accumulated absolute values of the difference between an average value $avePmi$ of an indicated mean effective pressure $Pmi$ and respective indicated mean effective pressures $Pmi$, divided by the average value $avePmi$ of that indicated mean effective pressure. Alternatively, the combustion state index value may be the quotient ($\sigma NE/aveNE$), or the reciprocal thereof ($aveNE/\sigma NE$), of a value $\sigma NE$, which is the sum of the accumulated absolute values of the difference between an average value $aveNE$ of the engine speed at a predetermined timing (past N cycle) and an instantaneous value $NE$ of the engine speed with respect to a predetermined crank angle amount (e.g., a crank, angle of 720 degrees corresponding to two rotations of the engine) at that timing, divided by the average value $aveNE$ of the engine speed. The values $\sigma Pmi$ and $\sigma NE$ both increase as the combustion state deteriorates. Therefore, the combustion state index value uniformly increases or uniformly decreases as the combustion state deteriorates.

Meanwhile, the operating gas amount regulating means regulates the amount of operating gas supplied to the combustion chamber based on the obtained combustion state index value.

Accordingly, the amount of operating gas, which affects the combustion state, can be changed according to the actual combustion state. Therefore, the argon concentration can be changed within a range in which the actual combustion state will not deteriorate to an unacceptable level. As a result, the thermal efficiency can be increased without leading to excessive deterioration in the combustion state, or a desirable combustion state can be maintained.

In this case, the operating gas amount regulating means may regulate the operating gas amount so that the maximum operating gas amount is supplied to the combustion chamber within a range in which the obtained combustion state index value is a value indicative of a better combustion state than an allowable predetermined combustion state.

Without taking deterioration of the combustion state into consideration, heat generated by the combustion of hydrogen can be applied to the operating gas with higher efficiency the more operating gas there is in the mixed gas, resulting in good thermal efficiency of the internal combustion engine. As described above, however, the oxygen concentration decreases the more the operating gas concentration exceeds the value D0, which results in the combustion state deteriorating to an unacceptable level. Accordingly, by regulating the operating gas amount so that the maximum operating gas amount is supplied to the combustion chamber within the range in which the obtained combustion state index value is a value indicative of a better combustion state than the acceptable predetermined combustion state, like the structure described above, the operating gas concentration becomes a value close to the value D0 so the thermal efficiency of the internal combustion engine can be extremely high.

Also, the operating gas amount regulating means may regulate the operating gas amount supplied to the combustion chamber so that the obtained combustion state index value falls within a predetermined range.

Accordingly, the concentration of the operating gas can be controlled so that the combustion state will not deteriorate excessively and the thermal efficiency will be high.

A fourth aspect of the invention relates to a control method for an operating gas circulation type internal combustion engine which generates power by combusting hydrogen in a combustion chamber of the internal combustion engine and expanding an operating gas which is an inert gas having a larger specific heat ratio than oxygen using heat generated by that combustion, and supplies operating gas in post-combustion gas discharged from the combustion chamber to the combustion chamber again. This control method includes the steps of determining a required torque which is the torque required of the internal combustion engine; determining an amount of hydrogen and an amount of oxygen to be supplied to the combustion chamber based on the required torque; supplying the determined amount of hydrogen and the determined amount of oxygen to the combustion chamber; determining an amount of operating gas to be supplied to the combustion chamber according to the required torque; and regulating the amount of operating gas supplied to the combustion chamber such that the determined amount of operating gas is supplied to the combustion chamber.

A fifth aspect of the invention relates to a control method for an operating gas circulation type internal combustion engine which generates power by combusting hydrogen in a combustion chamber of the internal combustion engine and expanding an operating gas which is an inert gas having a larger specific heat ratio than oxygen using heat generated by that combustion, and supplies operating gas in post-combustion gas discharged from the combustion chamber to the combustion chamber again. This control method includes the steps of determining a required torque which is the torque required of the internal combustion engine; determining an amount of hydrogen to be supplied to the combustion chamber based on the required torque; supplying the determined amount of hydrogen to the combustion chamber; determining an amount of oxygen to be supplied to the combustion chamber based on the determined amount of hydrogen; supplying the determined amount of oxygen to the combustion chamber; determining an amount of operating gas to be supplied to the combustion chamber based on the required torque; and regulating the amount of operating gas supplied to the combustion chamber such that the determined amount of operating gas is supplied to the combustion chamber.

A sixth aspect of the invention relates to a control method for an operating gas circulation type internal combustion engine which generates power by supplying hydrogen, oxygen, and an operating gas which is an inert gas having a larger specific heat ratio than oxygen to a combustion chamber of the internal combustion engine and expanding the operating gas using heat generated by combusting the hydrogen, and supplies operating gas in post-combustion gas discharged from the combustion chamber to the combustion chamber again. This control method includes the steps of obtaining a combustion state index value which is a value indicative of the combustion state of the internal combustion engine; and regulating an amount of operating gas supplied to the combustion chamber based on the obtained combustion state index value.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 12 is a flowchart illustrating a routine executed by a CPU of an internal combustion engine according to a first modified example of the second example embodiment of the invention;

FIG. 16 is a flowchart illustrating a routine executed by a CPU of an internal combustion engine according to a modified example of the third example embodiment of the invention.

DETAILED DESCRIPTION OF THE PREFERRED EMBODIMENTS

Figure 1:
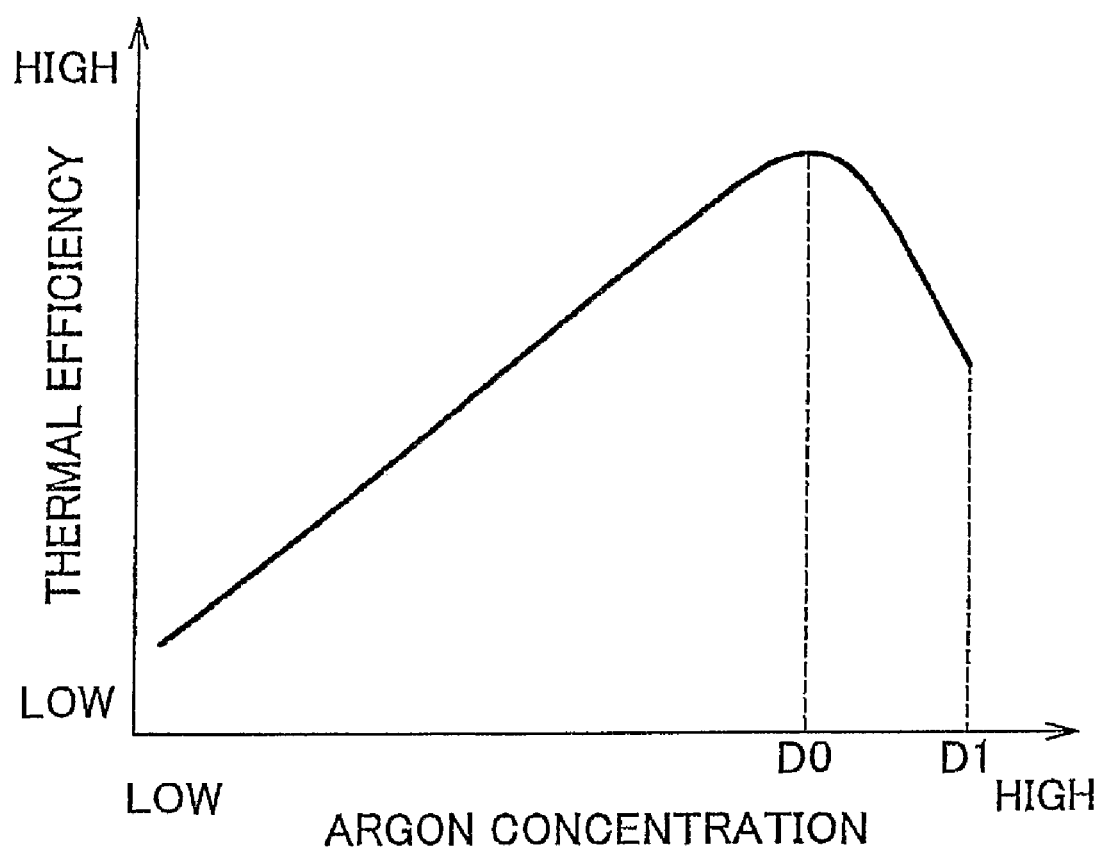
FIG. 1 is a graph illustrating a change in thermal efficiency of an internal combustion engine with respect to the concentration of argon (i.e., argon flow rate) which serves as the operating gas.
Figure 2:
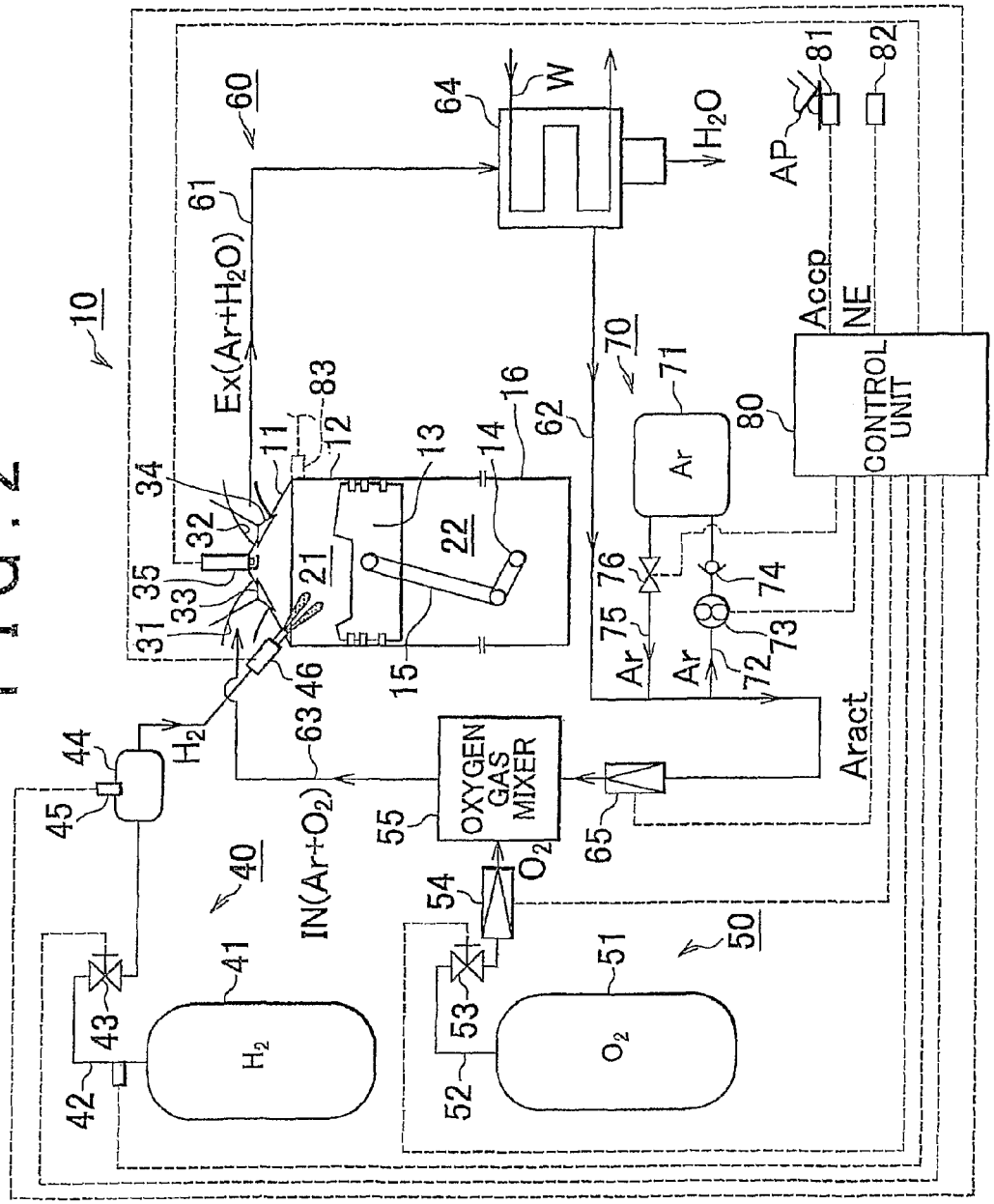
FIG. 2 is a block diagram schematically showing an internal combustion engine according to a first example embodiment of the invention.

Hereinafter, example embodiments of an internal combustion engine (i.e., a multiple cylinder internal combustion engine) according to the invention will be described with reference to the accompanying drawings. FIG. 2 is a block diagram schematically showing an internal combustion engine 10 according to a first example embodiment of the invention. Although only a cross-section of a specific cylinder of the internal combustion engine 10 is shown in FIG. 2, the other cylinders have the same structure. This internal combustion engine 10 is an operating gas circulation type internal combustion engine (i.e., a hydrogen-burning closed cycle engine) which generates power by combusting hydrogen in a combustion chamber and expanding operating gas which is an inert gas using heat generated from the combustion, and then supplies the operating gas in the post-combustion gas that, was discharged from the combustion chamber into the combustion chamber again.

The operating gas is an inert gas that functions as a heat expanding body and preferably has a larger specific heat ratio than oxygen. In order to further improve the thermal efficiency of the internal combustion engine, the operating gas preferably a gas having the largest specific heat ratio possible. Some known examples of this kind of gas are inert gases made up of monatomic molecules, such as argon, helium, and neon. Argon will be used as the operating gas in this example embodiment.

The internal combustion engine 10 includes a cylinder head 11 formed by a cylinder head portion, a cylinder 12 formed by a cylinder block portion, a piston 13 the moves up and down inside the cylinder 12, a crankshaft 14, a connecting rod 15 which connects the piston 13 to the crankshaft 14 and converts rotary motion of the crankshaft 14 into reciprocating motion of the piston 13, and an oil pan 16 which is connected to the cylinder block. The bottom surface of the cylinder head 11, the walls of the cylinder 12, and the top surface of the piston 13 together define a combustion chamber 21.

An intake port 31 and an exhaust port 32, both of which are communicated with the combustion chamber 21, are formed in the cylinder head 11. An intake valve 33 which opens and closes the intake port 31 is arranged in the intake port 31, and an exhaust valve 34 which opens and closes the exhaust port 32 is arranged in the exhaust port 32. Moreover, a spark plug 35 that includes an ignition coil is arranged is substantially the center portion of the cylinder head 11.

The internal combustion engine 10 also includes a hydrogen supply potion 40, an oxygen supply portion 50, an operating gas circulation path 60, an argon supply amount regulating portion 70, and an electric control unit 80.

The hydrogen supply portion 40 includes a hydrogen tank 41, a hydrogen gas passage 42, a hydrogen gas pressure regulator 43, a surge tank 44, a surge tank pressure sensor 45, and an in-cylinder injection valve (hydrogen injection valve) 46.

The hydrogen tank 41 is an accumulator tank that stores hydrogen gas under a pressure of 10 to 70 MPa. The hydrogen gas passage 42 is a passage (i.e., a hydrogen gas line or delivery pipe) which provides communication between the hydrogen tank 41 and the in-cylinder injection valve 46. A hydrogen gas pressure regulator 43 and the surge tank 44 are interposed in the hydrogen gas passage 42 between the hydrogen tank 41 and the in-cylinder injection valve 46 in that order from the hydrogen tank 41 side toward the in-cylinder injection valve 46 side.

The hydrogen gas pressure regulator 43 is a known variable pressure regulator that regulates the pressure in the hydrogen gas passage 42 (and therefore the surge tank 44) downstream of the hydrogen gas pressure regulator 43 to a target hydrogen pressure PH2tgt according to a command signal. The surge tank 44 reduces pulsations generated in the hydrogen gas passage 42 when the hydrogen gas is injected.

The surge tank pressure sensor 45 is arranged in the surge tank 44. The surge tank pressure sensor 45 detects the pressure of the hydrogen gas in the surge tank 44 and generates a signal indicative of the detected pressure (that is, the surge tank pressure, i.e., the pressure of the injected hydrogen gas) Psg. The in-cylinder injection valve 46 is arranged in the cylinder head 11 so as to directly inject hydrogen gas into the combustion chamber 21 (i.e., into the cylinder) in response to a drive signal.

The oxygen supply portion 50 includes an oxygen tank (i.e., an oxygen gas tank) 51, an oxygen gas passage 52, an oxygen gas pressure regulator 53, an oxygen gas flow rate meter 54, and an oxygen gas mixer 55.

The oxygen tank 51 is a tank that stores oxygen gas in a gaseous state. The oxygen gas passage 52 is a passage (line) which provides communication between the oxygen tank 51 and the oxygen gas mixer 55. The oxygen gas pressure regulator 53 and the oxygen gas flow rate meter 54 are interposed in the oxygen gas passage 52 between the oxygen tank 51 and the oxygen gas mixer 55 in that order from, the oxygen tank 51 side toward the oxygen gas mixer 55 side.

The oxygen gas pressure regulator 53 is a known variable pressure regulator that regulates the pressure in the oxygen gas passage 52 downstream (i.e., on the oxygen gas mixer 55 side) of the oxygen gas pressure regulator 53 according to a command signal. In other words, the oxygen gas pressure regulator 53 is able to regulate the amount of oxygen gas that flows through the oxygen gas passage 52 in response to a command signal.

The oxygen gas flow rate meter 54 measures the amount of oxygen gas flowing through the oxygen gas passage 52 (i.e., the oxygen gas flow rate) and generates a signal indicative of that oxygen gas flow rate FO2. The oxygen gas mixer 55 is interposed between a second passage 62 and a third passage 63 in the operating gas circulation path 60, which will be described later. The oxygen gas mixer 55 mixes oxygen supplied via the oxygen gas passage 52 with gas supplied to an inlet via the second passage 62. The mixed gas is then discharged to the third passage 63 from an outlet.

The operating gas circulation path 60 includes the first to the third passages 61 to 63 (i.e., the lines forming the first to third flow paths), a condenser 64, and an argon gas flow rate meter 65.

The first passage 61 connects the exhaust port 32 to an inlet of the condenser 64. The second passage 62 connects an outlet of the condenser 64 to an inlet of the oxygen gas mixer 55. The argon gas flow rate meter 65 is disposed in the second passage 62. The third passage 63 connects the outlet of the oxygen gas mixer 55 to the intake port 31. Thus the first to the third passages 61 to 63 form a closed path (circulation path) which circulates gas from the exhaust port 32 to the intake port 31.

The condenser 64 condenses, i.e., liquefies, water vapor in the exhaust gas by introducing exhaust gas discharged from the combustion chamber 21 via the first passage 61 from the inlet of the condenser 64 and cooling it using coolant W therein. Accordingly, the condenser 64 separates the water vapor in the exhaust gas from the noncondensable gas (in this case, the noncondensable gas is argon, and may include hydrogen gas and/or oxygen gas), liquefies the water vapor, and discharges the resultant water out of the system. Further, the condenser 64 supplies the separated noncondensable gas from the outlet of the condenser 64 to the second passage 62.

The argon gas flow rate meter 65 measures the amount of argon gas per unit time flowing through the second passage 62 (i.e., the argon flow rate), and generates a signal indicative of the argon flow rate Aract.

The argon supply amount regulating portion 70 includes an argon storage tank 71, an argon storage passage 72, an argon storage pump 73, a check valve 74, an argon supply passage 75, and an argon supply valve 76.

The argon storage tank 71 is a tank which stores argon. The argon storage passage 72 connects the argon storage tank 71 to the second passage 62. The argon storage pump 73 and the check valve 74 are interposed in the argon storage passage 72 between the second passage 62 side to the argon storage tank 71 in that order from the second passage 62 side toward the argon storage tank 71 side.

The argon storage pump 73 is an electric pump which is driven in response to a drive signal so as to supply argon flowing in the second passage 62 to the argon storage tank 71. The check valve 74 allows the argon to only flow from in the direction from the argon storage pump 73 to the argon storage tank 71 and prevents it from flowing in the opposite direction.

The argon supply passage 75 connects the argon storage tank 71 to the second passage 62. The argon supply valve 76 is interposed in the argon supply passage 75 and opens and closes in response to a drive signal. When the argon supply valve 76 is open, argon is supplied from the argon storage tank 71 to the second passage 62. When the argon supply valve 76 is closed, the supply of argon from the argon storage tank 71 to the second passage 62 is stopped.

The electric control unit 80 is an electronic apparatus which is mainly a known microcomputer that includes a CPU, ROM, RAM, and an interface. The electric control unit 80 is connected to the surge tank pressure sensor 45, the oxygen gas flow rate meter 54, the argon gas flow rate meter 65, an accelerator pedal operating amount sensor 81, and an engine speed sensor 82. The electric control unit 80 receives various measurement signals (i.e., detection signals) from these sensors and meters.

The accelerator pedal operating amount sensor 81 detects the operating amount of an accelerator pedal AP and outputs a signal Accp indicative of that operating amount. The engine speed sensor 82 generates a signal indicative of a crank angle and a signal NE indicative of the engine speed based on the rotation speed of the crankshaft 14.

Moreover, the electric control unit 80 is also connected to the spark plug 35 of each cylinder, the in-cylinder injection valve 46 of each cylinder, the hydrogen gas pressure regulator 43, the oxygen gas pressure regulator 53, the argon storage pump 73, and the argon supply valve 76, all to which the electric control unit 80 sends drive signals or command signals.

Next, operation of the internal combustion engine structured as described above will be described. The CPU of the electric control unit 80 executes a routine shown by the flowchart in FIG. 3 at predetermined intervals of time. Accordingly, the CPU starts the routine by performing step 300 at a predetermined timing and then proceeds on to steps 305 through 320, described below.

Step 305: The CPU obtains a required torque tqtgt, which is the torque required of the internal combustion engine according to an operation by a driver, based on the accelerator pedal operating amount Accp at that time, the engine speed NE at that time, and a lookup table Maptqtgt.

Figure 4:
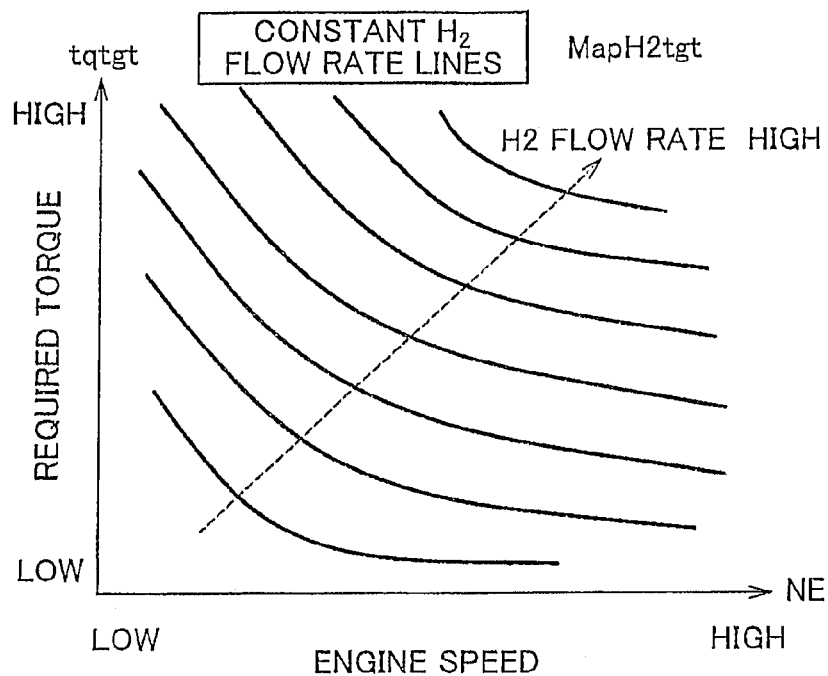
FIG. 4 is a lookup table that is referenced when the CPU of the electric control unit shown in FIG. 2 determines a required amount of hydrogen.

Step 310: The CPU obtains a required hydrogen amount (the amount of hydrogen required in a unit of time, i.e., the required, hydrogen flow rate) H2tgt based on the required torque tqtgt obtained in step 305, the engine speed NE at that time, and a lookup table MapH2tgt shown in FIG. 4. The table MapH2tgt shown in FIG. 4 is a table in which the amount of hydrogen per unit time (i.e., the hydrogen flow rate) that needs to be supplied to the combustion chamber 21 in order for the internal combustion engine 10 to generate torque equal to the torque required is set through testing with respect to each required torque and each engine speed when the internal combustion engine 10 is operated at maximum thermal efficiency in a range where the amount of argon is appropriate and the combustion state will not deteriorate excessively.

Step 315: The CPU obtains a required oxygen amount (that is, the amount of oxygen required in a unit of time, i.e., the required oxygen flow rate) O2tgt based on the required hydrogen amount H2tgt obtained in step 310 and a function funcO2. The function funcO2 is a function that converts the required hydrogen amount H2tgt into, a number of moles and then obtains the amount of oxygen of half of that number of moles (or obtains the amount of oxygen of the number of moles that is the sum of half the number of moles of the required hydrogen amount H2tgt plus a predetermined margin) as the required oxygen amount O2tgt. In this case, the required hydrogen amount H2tgt is an amount corresponding to the required torque tqtgt so the required oxygen amount O2tgt is also an amount determined according to the required torque tqtgt.

Figure 5:
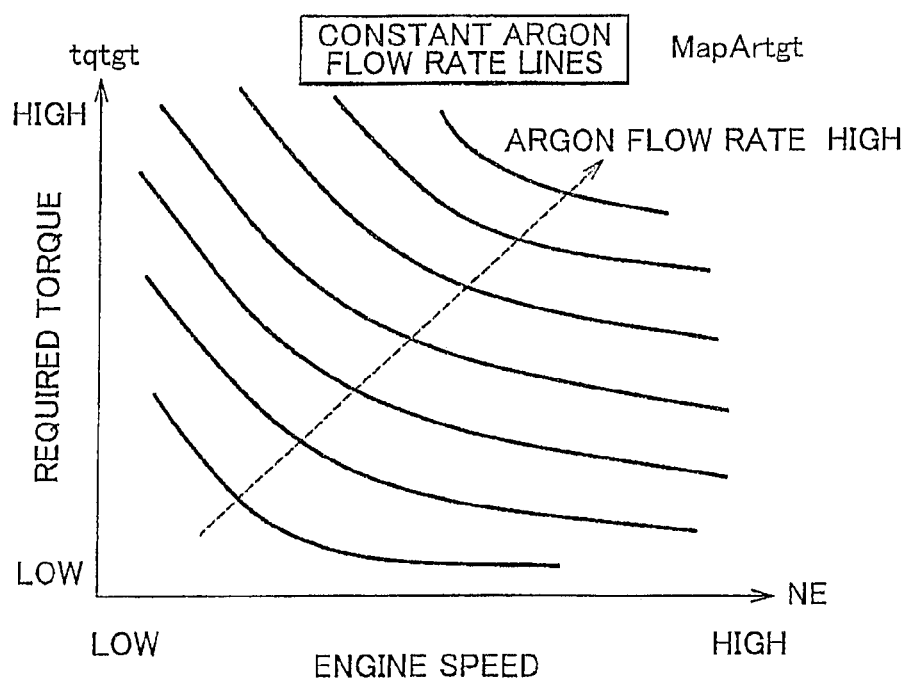
FIG. 5 is a lookup table that is referenced when the CPU of the electric control unit shown in FIG. 2 determines a required amount of argon.

Step 320: The CPU obtains a required argon amount (that is, the amount of argon required in a unit of time, i.e., the required argon flow rate) Artgt based on the required torque tqtgt obtained in step 305, the engine speed NE at that time, and a lookup table MapArtgt shown in FIG. 5. The table MapArtgt determines the amount of argon presumed when determining the table MapH2tgt shown in FIG. 4, and is a table in which the amount of argon that results in maximum thermal efficiency of the internal combustion engine 10 is determined through testing with respect to each required torque and each engine speed. In other words, supplying argon of an amount determined according to the table MapArtgt results in the argon concentration in the mixed gas (i.e., the operating gas concentration) becoming the optimal value for the required torque.

Next, the CPU proceeds on to step 325 where it determines whether the argon flow rate Aract obtained from the argon gas flow rate meter 65 matches the required argon amount Artgt determined in step 320. If they both match at this time, the determination in step 325 is "Yes" and the CPU proceeds on to step 395 where it ends this cycle of the routine.

If, on the other hand, the argon flow rate Aract does not match the required argon amount Artgt, then the determination in step 325 is "No" in which case the CPU proceeds on to step 330 where it determines whether the argon flow rate Aract is less than the required argon flow rate Artgt. If the argon flow rate Aract is less than the required argon amount Artgt, then the determination in step 330 is "Yes" and the CPU proceeds on to step 335 where it opens the argon supply valve 76. The CPU then proceeds on to step 340 where it stops driving the argon storage pump 73. The CPU then proceeds on to step 395 where it ends this cycle of the routine. Accordingly, argon is supplied from the argon storage tank 71 to the second passage 62. As a result, the amount of argon supplied to the combustion chamber 21 increases, thereby raising the argon concentration in the mixed gas.

If, on the other hand, it is determined in step 330 that the argon flow rate Aract is equal to or greater than the required argon amount Artgt, then the determination in step 330 is "No" and the CPU proceeds on to step 345 where it closes the argon supply valve 76. Next, the CPU proceeds on to step 350 where it drives the argon storage pump 73. The CPU then proceeds on to step 395 where it ends this cycle of the routine. Accordingly, some of the argon flowing through the second passage 62 is stored in the argon storage tank 71. As a result, the amount of argon supplied to the combustion chamber 21 decreases, thereby reducing the argon concentration in the mixed gas.

Figure 6:
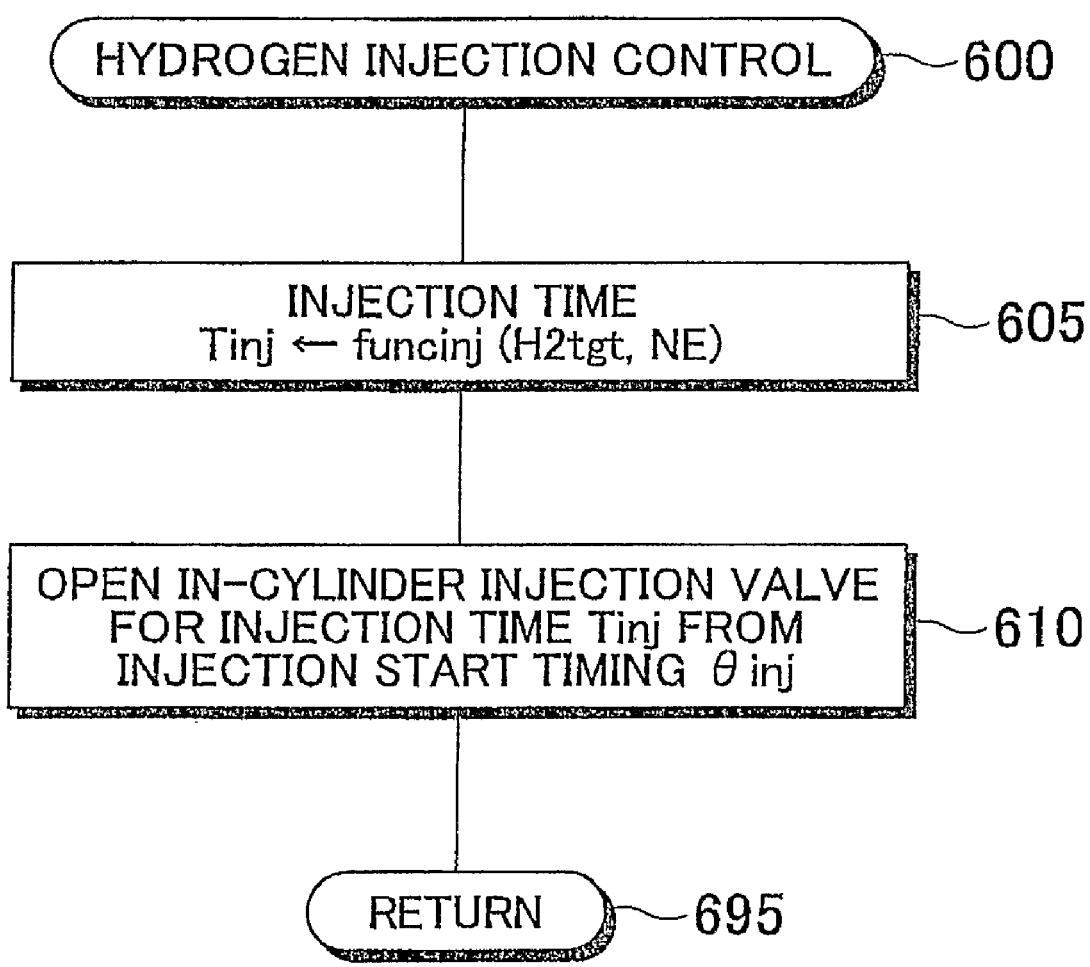
FIG. 6 is a flowchart illustrating another routine executed by the CPU of the electric control unit shown in FIG. 2.

Meanwhile, the CPU executes a hydrogen injection routine shown in FIG. 6 every time the crank angle of each cylinder matches a predetermined crank angle. Accordingly, when the crank angle of a given cylinder matches the predetermined crank angle for that cylinder, the CPU starts the routine from step 600 and then proceeds on to step 605 where it determines an injecting time (i.e., the time for which the in-cylinder injection valve 46 is open) Tinj based on the required hydrogen amount H2tgt obtained in step 310 in FIG. 3, the engine speed NE at that time, and a function funcinj. At this time the function funcinj may also determine the injection time Tinj based also on the surge tank pressure Psg detected by the surge tank pressure sensor 45.

Next, the CPU proceeds on to step 610 where it performs a setting for outputting a drive signal that opens the in-cylinder injection valve 46 of that cylinder for the injection time Tinj starting from the point at which the crank angle of that cylinder matches an injection start timing θinj. The CPU then proceeds on to step 695 where it ends this cycle of the routine.

Moreover, the CPU also controls the hydraulic pressure gas pressure regulator 43 so that the surge tank pressure Psg detected by the surge tank pressure sensor 45 matches a predetermined target pressure by executing another routine, not shown. In the manner described above, hydrogen of an amount that corresponds to the required hydrogen amount H2tgt is injected from the in-cylinder injection valve 46 of each cylinder.

Figure 7:
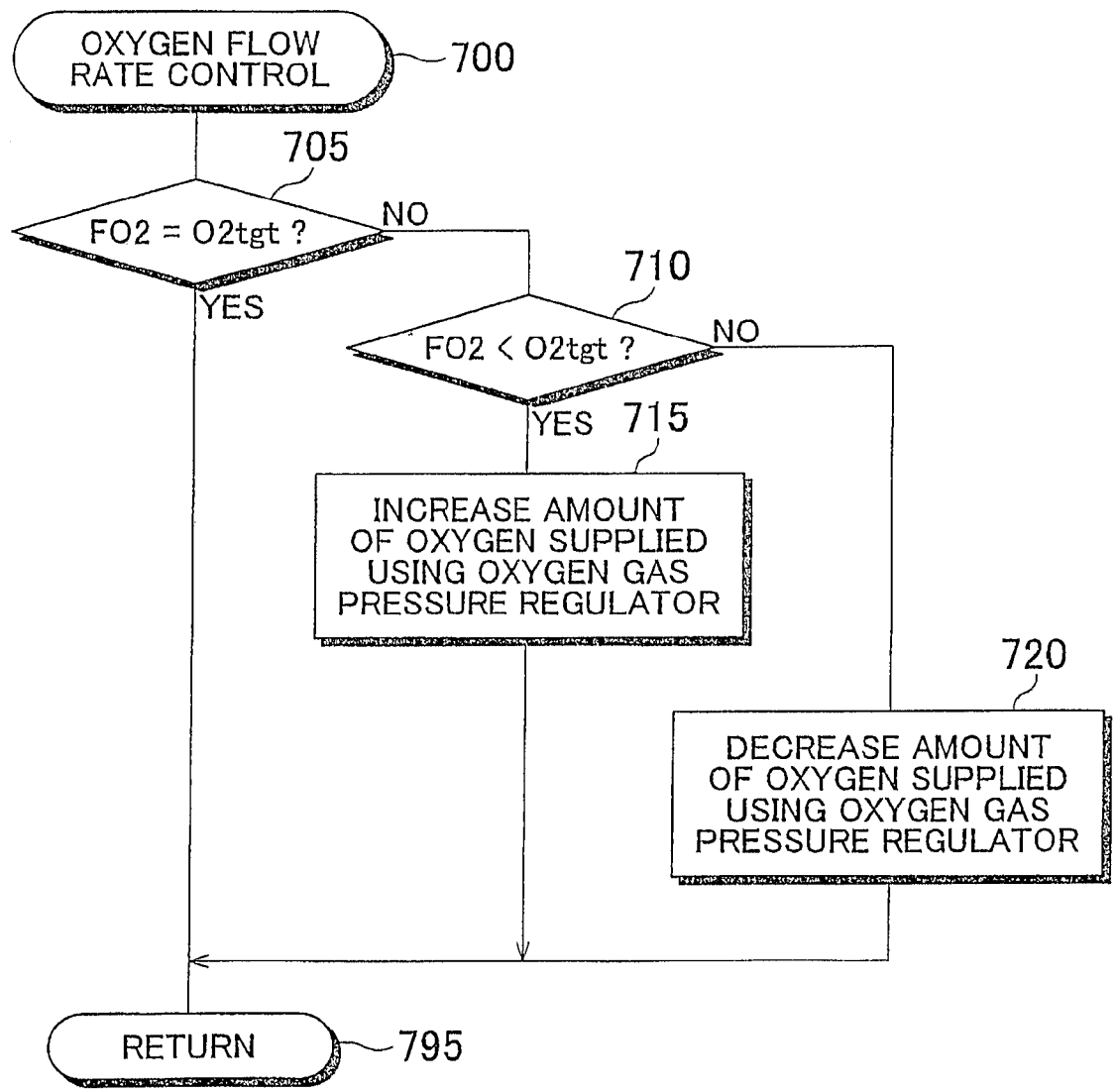
FIG. 7 is a flowchart illustrating yet another routine executed by the CPU of the electric control unit shown in FIG. 2.

Furthermore, the CPU executes an oxygen flow rate control routine shown in FIG. 7 at predetermined intervals of time. Accordingly, at a predetermined timing, the CPU starts the routine with step 700 and then proceeds on to step 705 where it determines whether the oxygen gas flow rate FO2 obtained from the oxygen gas flow rate meter 54 matches the required oxygen amount O2tgt determined in step 315 in FIG. 3. If they both match at this time, the determination in step 705 is "Yes" and the CPU proceeds on to step 795 where it ends this cycle of the routine.

If, on the other hand, the oxygen gas flow rate FO2 does not match the required oxygen amount O2tgt, the determination in step 705 is "No" and the CPU proceeds on to step 710 where it determines whether the oxygen gas flow rate FO2 is less than the required oxygen amount O2tgt. If the oxygen gas flow rate FO2 is less than the required oxygen amount O2tgt, then the determination in step 710 is "Yes" and the CPU proceeds on to step 715 where it controls the oxygen gas pressure regulator 53 to increase the amount of oxygen supplied to the third passage 63 via the oxygen gas mixer 55. The CPU then proceeds on to step 795 where it ends this cycle of the routine.

If, on the other hand, it is determined in step 710 that the oxygen gas flow rate FO2 is equal to or greater than the required oxygen amount O2tgt, then the determination in step 710 is "No" and the CPU proceeds on to step 720 where it controls the oxygen gas pressure regulator 53 to reduce the amount of oxygen supplied to the third passage 63 via the oxygen gas mixer 55. The CPU then proceeds on to step 795 where it ends this cycle of the routine. In this way, oxygen of an amount equal to the required oxygen amount O2tgt is supplied to the combustion chamber 21 of the internal combustion engine 10.

In addition, the CPU also determines an ignition timing θig based on the required torque tqtgt and the engine speed NE, and outputs a drive signal (i.e., a command signal to execute ignition) to the spark plug 35 of the corresponding cylinder so that ignition is performed at that ignition timing θig by executing another routine, not shown. As a result, hydrogen is combusted in the combustion chamber 21.

As described above, the internal combustion engine 10 according to the first example embodiment of the invention is an operating gas circulation type internal combustion engine that generates power by combusting hydrogen in the combustion chamber 21 of the internal combustion engine and expanding an operating gas (such as argon) which is an inert gas having a specific heat ratio greater than oxygen using heat generated by that combustion, and then supplies the operating gas in the post-combustion gas that has been discharged from the combustion chamber into the combustion chamber again. This internal combustion engine 10 includes hydrogen and oxygen supplying means (i.e., the hydrogen supply portion 40, the oxygen supply portion 50, and the electric control unit 80 that executes the routines shown in FIGS. 6 and 7) and operating gas amount regulating means (i.e., the argon supply amount regulating portion 70, and the electric control unit 80 which executes the appropriate steps from among steps 325 to 350 in FIG. 3). The hydrogen and oxygen supplying means determines the respective amounts of hydrogen and oxygen supplied to the combustion chamber so that the internal combustion engine generates torque that corresponds to a required torque which is the torque required of the internal combustion engine (steps 305 to 315 in FIG. 3), and supplies the determined amount of hydrogen and the determined amount of oxygen to the combustion chamber. The operating gas amount regulating means determines the amount of operating gas to be supplied to the combustion chamber according to the required torque (step 320 in FIG. 3) and regulates the amount of operating gas supplied to the combustion chamber so that the determined amount of operating gas is supplied to the combustion chamber.

Accordingly, even if the amounts of hydrogen and oxygen change due to a change in the required torque, the internal combustion engine 10 can change the concentration of the operating gas in the mixed gas that includes hydrogen, oxygen, and the operating gas to a desirable value according to the required torque. As a result, the thermal efficiency of the internal combustion engine 10 can be improved while maintaining a good combustion state.

Also, the internal combustion engine 10 may also include hydrogen supplying means, oxygen supplying means, and the operating gas amount regulating means described above. The hydrogen supplying means (i.e., the hydrogen supply portion 40 and the electric control unit 80 that executes the routine shown in FIG. 6) determines the amount of hydrogen to be supplied to the combustion chamber based on a required torque which is the torque required of the internal combustion engine (step 310 in FIG. 3), and supplies the determined amount of hydrogen to the combustion chamber. The oxygen supplying means (i.e., the oxygen supply portion 50 and the electric control unit 80 that executes the routine shown in FIG. 7) determines the amount of oxygen to be supplied to the combustion chamber based on the determined amount of hydrogen (i.e., step 315 in FIG. 3), and supplies the determined amount of oxygen to the combustion chamber.

Accordingly, the respective amounts of the hydrogen, oxygen, and operating gas are all primarily determined according to the required torque. As a result, even if the amount of hydrogen and the amount of oxygen change due to a change in the required torque, the concentration of the operating gas in the mixed gas that includes the hydrogen, oxygen, and the operating gas can be changed to a value that is desirable for the required torque. Accordingly, the thermal efficiency of the internal combustion engine can be improved while maintaining a good combustion state.

In the first example embodiment, the required oxygen amount O2tgt is determined based on the required hydrogen amount H2tgt. Alternatively, however, the required oxygen amount O2tgt may be directly obtained based on the required torque tqtgt, the engine speed NE, and a lookup table MapO2tgt without using the required hydrogen amount H2tgt.

Moreover, in the first example embodiment, the required hydrogen amount H2tgt is obtained according to the required torque tqtgt and hydrogen of the obtained required hydrogen amount H2tgt is supplied to the combustion chamber 21. Also, oxygen of an amount that is greater than the oxygen amount necessary to combust the hydrogen of that required hydrogen amount H2tgt is obtained as the required oxygen amount O2tgt, and oxygen of that obtained required oxygen amount O2tgt is supplied to the combustion chamber 21.

Alternatively, however, the required hydrogen amount H2tgt may be obtained according to the required torque tqtgt and the oxygen amount of the number of moles that is exactly half of the number of moles of that required hydrogen amount H2tgt may be obtained as the required hydrogen amount O2tgt. Oxygen of that obtained required oxygen amount O2tgt and hydrogen of an amount larger than the required hydrogen amount H2tgt may then be supplied to the combustion chamber 21.

An internal combustion engine according to a second example embodiment of the invention will now be described. This internal combustion engine obtains an indicated mean effective pressure change rate (σPmi/avePmi) as a value indicative of the combustion state of the internal combustion engine (hereinafter referred to as "combustion state index value"), and controls the argon amount based on the obtained indicated mean effective pressure change rate (σPmi/ave- Pmi). The indicated mean effective pressure change rate (σPmi/avePmi) is the quotient of a value σPmi, which is the sum of the accumulated absolute values of the difference between an average value avePmi of an indicated mean effective pressure Pmi and the respective indicated mean effective pressures Pmi, divided by that average value avePmi of the indicated mean effective pressure, as will be described in detail later. If the combustion state deteriorates, the width of change in the indicated mean effective pressure Pmi increases so the indicated mean effective pressure change rate (σPmi/avePmi) increases uniformly as the combustion state deteriorates.

The combustion state index value may also use the reciprocal (avePmi/σPmi) of the indicated mean effective pressure change rate described above. In this case, if the combustion state deteriorates, the width of the change in the indicated mean effective pressure Pmi increases. Accordingly, the reciprocal (avePmi/σPmi) of the indicated mean effective pressure change rate decreases uniformly as the combustion state deteriorates.

Figure 8:
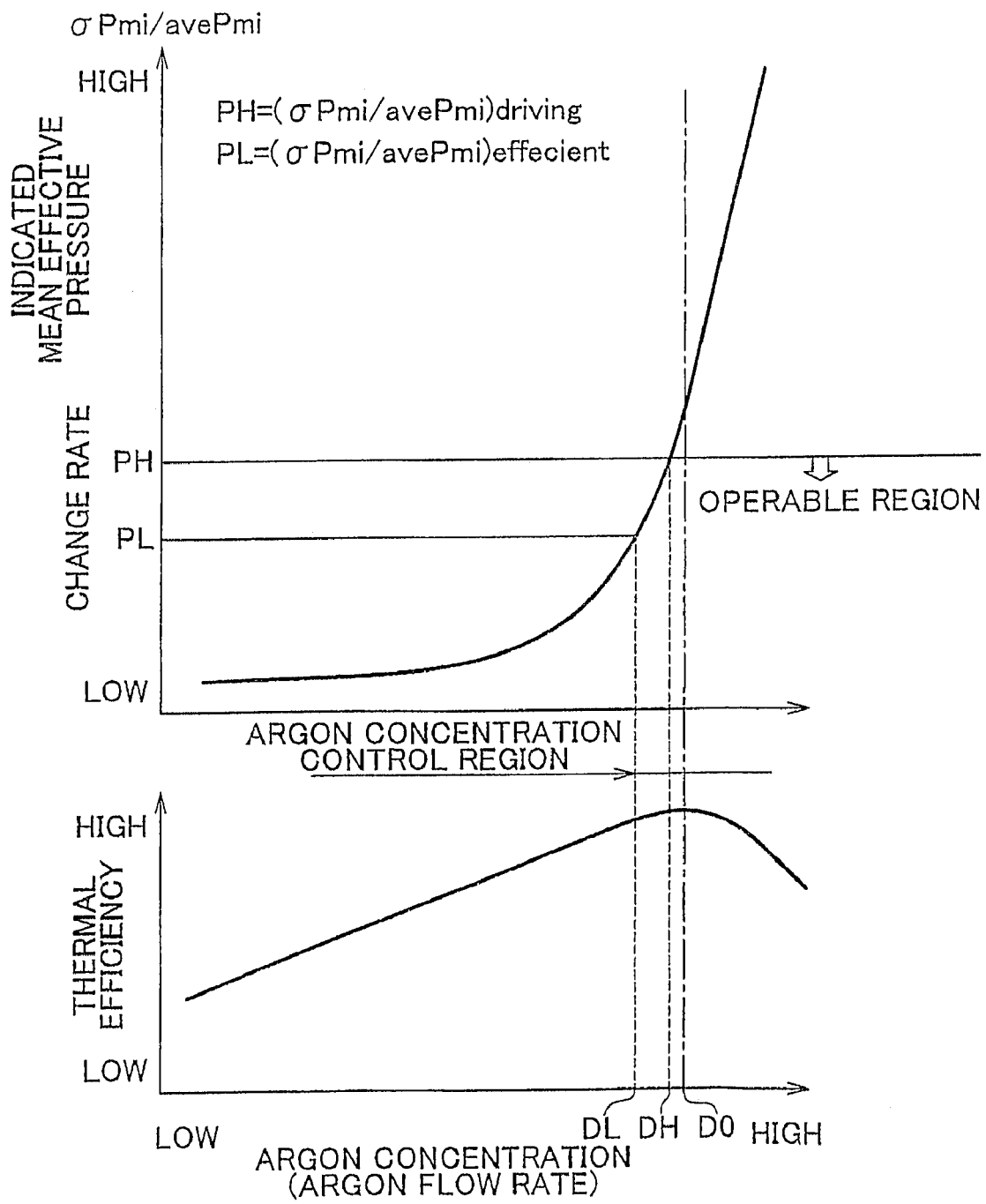
FIG. 8 is a graph illustrating the operation of an internal combustion engine according to a second example embodiment of the invention.

FIG. 8 is a graph showing the manner of change in the thermal efficiency of the internal combustion engine 10 and the indicated mean effective pressure change rate (σPmi/avePmi) with respect to the argon concentration of the mixed gas when the amounts of the oxygen and hydrogen supplied to the combustion chamber 21 are maintained at predetermined values. As is evident from the graph in FIG. 8, as the argon concentration gradually increases from a low value, the oxygen concentration of the mixed gas decreases comparatively so the combustion state deteriorates. Accordingly, the indicated mean effective pressure change rate (σPmi/avePmi) gradually increases. On the other hand, the thermal efficiency increases with an increase in the argon concentration within a range in which the argon concentration is less than the value D0.

When the argon concentration exceeds a value DH which is slightly less than the value D0 where the thermal efficiency is at its highest, the combustion state deteriorates to an unacceptable level due to the oxygen concentration in the mixed gas falling too low. That is, when the argon concentration is at the value D0, the thermal efficiency is at its highest, but in this state the combustion state deteriorates too much and engine vibration becomes too-severe.

Therefore, this internal combustion engine controls the argon concentration so that it becomes a value between the value DH and a value DL which is slightly less than the value DH. More specifically, the indicated mean effective pressure change rate (σPmi/avePmi) when the argon concentration is the value DH is a value PH (=(σPmi/avePmi) driving, a high side threshold value), and the indicated mean effective pressure change rate (σPmi/avePmi) when the argon concentration is the value DL is a value PL (=(σPmi/avePmi) efficient, low side threshold value). Therefore, the internal combustion engine controls the amount of argon supplied so that the indicated mean effective pressure change rate (σPmi/avePmi) falls within a range between the value PL and the value PH and close to the value PH (i.e., so that the argon concentration is at its maximum). As a result, this internal combustion engine can operate at an extremely high thermal efficiency without resulting in excessive deterioration of the combustion state.

Figure 3:
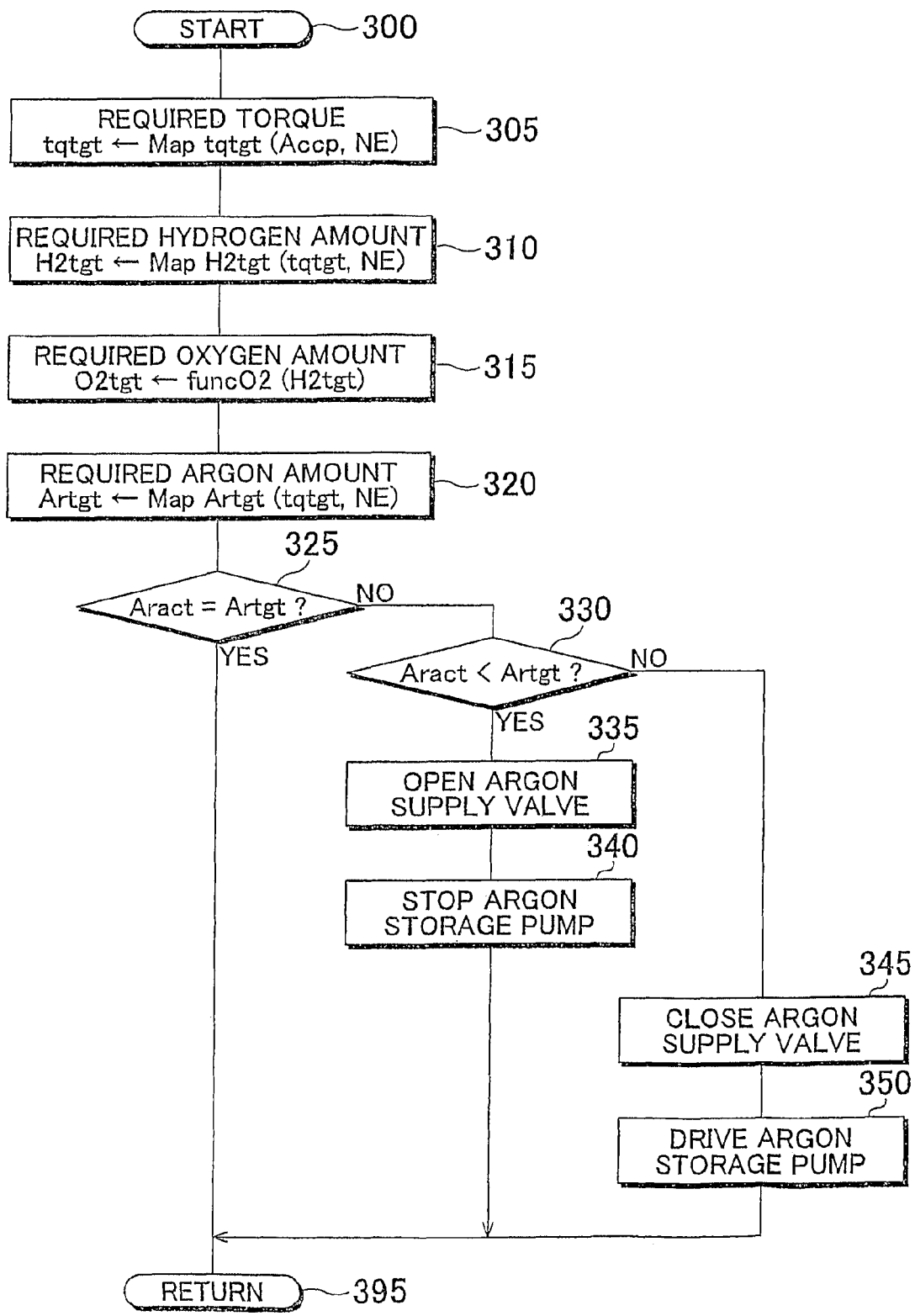
FIG. 3 is a flowchart illustrating a routine executed by a CPU of an electric control unit shown in FIG. 2.

Actually, the internal combustion engine according to the second example embodiment differs from the internal combustion engine 10 according to the first example embodiment in that it also includes an in-cylinder pressure sensor 83 indicated by the broken line in FIG. 2, and the CPU of the electric control unit 80 executes routines shown in the flowchart of FIGS. 9A and 9B to 11 instead of the routine in FIG. 3. The following description will therefore focus on these points that are different. The in-cylinder pressure sensor 83 detects the pressure in the cylinder 21 (i.e., the in-cylinder pressure) and outputs a signal indicative of the detected in-cylinder pressure Pcy to the electric control unit 80.

When the required argon amount Artgt suddenly changes following a sudden change in the required torque tqtgt, the CPU performs open loop control on the argon amount for a predetermined period of time and then performs feedback control on the argon amount based on the indicated mean effective pressure change rate (σPmi/avePmi).

Figure 9A:
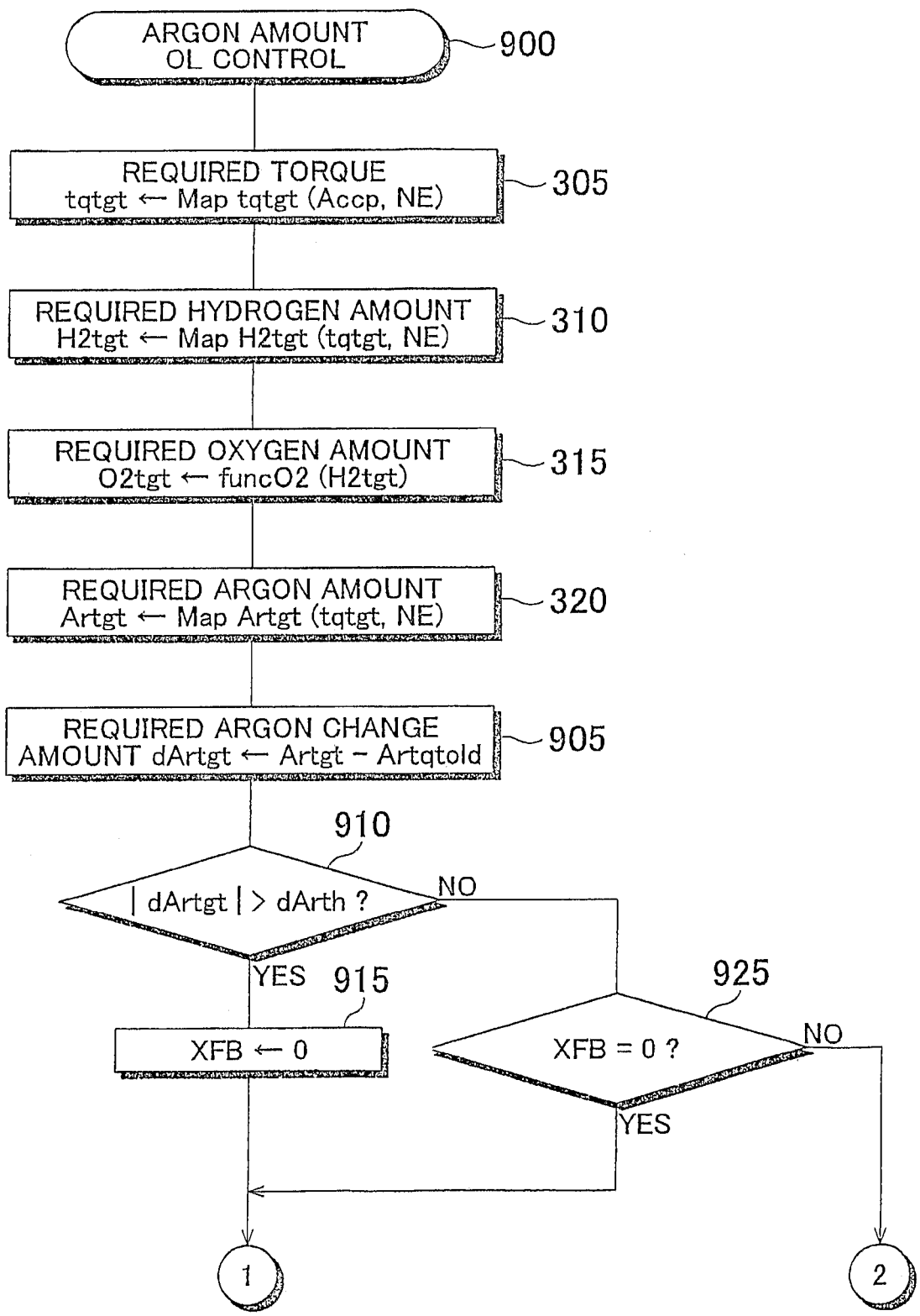
FIGS. 9A and 9B are flowcharts illustrating a routine executed by a CPU of the internal combustion engine according to the second example embodiment of the invention.
Figure 9B:
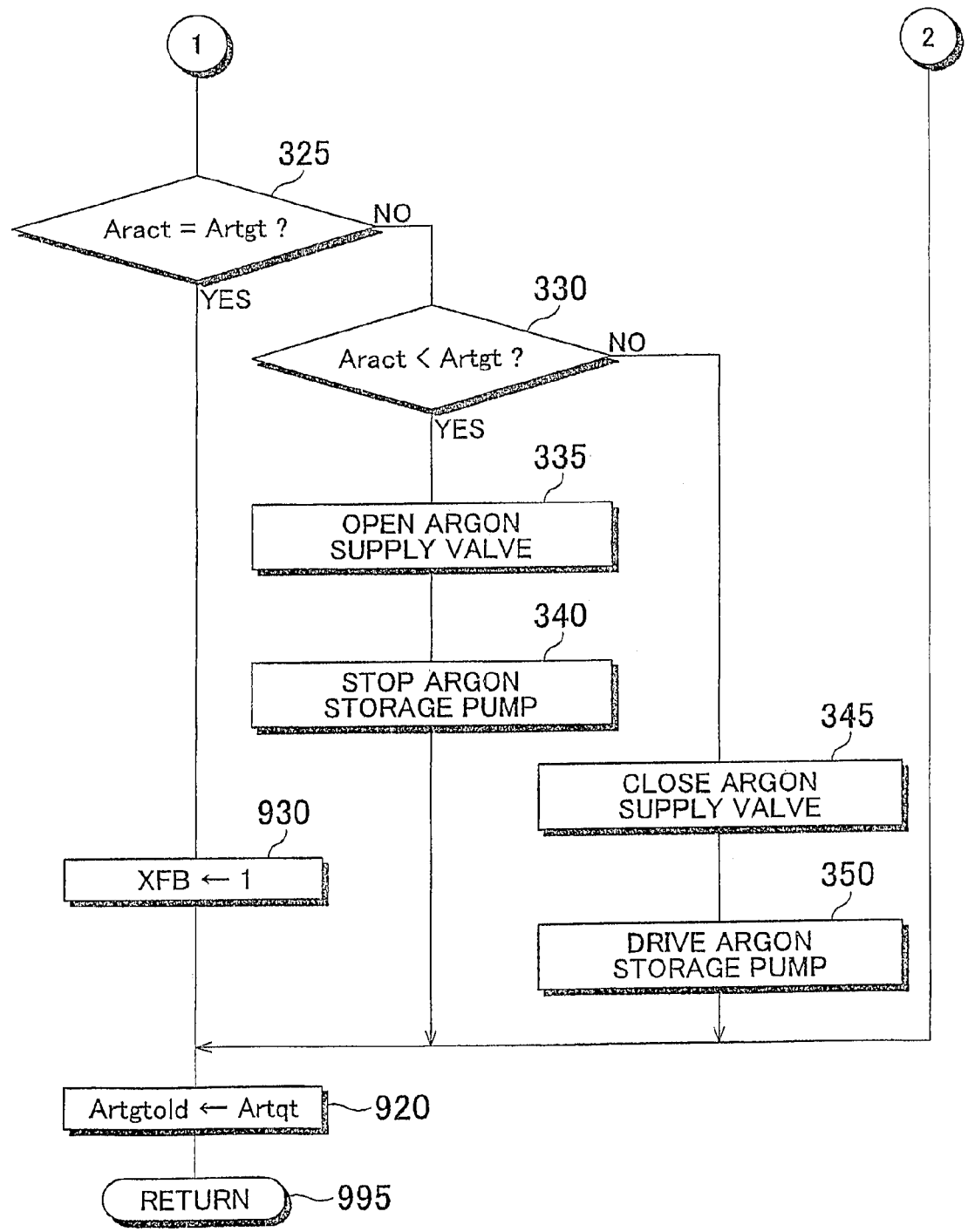

More specifically, an argon amount open loop control routine shown in FIGS. 9A and 9B are executed at predetermined intervals of time. Steps in FIGS. 9A and 9B that are the same as those in FIG. 3 will be denoted by the same reference numerals.

At a predetermined timing, the CPU starts the routine from step 900 and then performs steps 305 to 320 described above. As a result, the required torque tqtgt, the required hydrogen amount H2tgt, the required oxygen amount O2tgt, and the required argon amount Artgt are determined. Next, the CPU proceeds on to step 905 where it obtains the difference between a required argon amount Artgtold at the point when the routine was executed last (hereinafter referred to as "last required argon amount Artgtold") and a required argon amount Artgt at the current time (hereinafter referred to as "current required argon amount Artgt") as a required argon change amount dArtgt. The CPU then proceeds on to step 910 where it determines whether the absolute value of the required argon change amount dArtgt is greater than a reference value dArth.

If the required argon amount Artgt now suddenly changes following a sudden change in the required torque tqtgt, the determination in step 910 is "Yes" and the CPU proceeds on to step 915 where it sets the value of a feedback allowed flag XFB to "0". The CPU then proceeds on to step 325 where it determines whether the actual argon flow rate Aract at the current time matches the required argon amount Artgt.

The current time is immediately after the required argon amount Artgt has suddenly changed. Therefore, the argon flow rate Aract and the required argon amount Artgt do not match. As a result, the determination in step 325 is "No" so the CPU executes the appropriate steps from among steps 330 to 350. As a result, the actual argon flow rate Aract changes toward the required argon amount Artgt. Next, the CPU proceeds on to step 920 where it sets the current required argon amount Artgt as the last required argon amount Artgtold. The CPU then proceeds on to step 995 where it ends this cycle of the routine.

Thereafter, if the required argon amount continues to be stable, then when the CPU proceeds to step 910, the determination in that step is "No" so the CPU proceeds on to step 925 where it determines whether the value of the feedback allowed flag XFB is "0". In this case, the value of the feedback allowed flag XFB is "0" so the determination in step 925 is "Yes", after which the CPU proceeds on to step 325 and thereafter again.

These steps in the routine are executed repeatedly as long as the required argon amount Artgt does not suddenly change. Therefore, after a predetermined period of time has passed, the actual argon flow rate Aract will match the required argon amount Artgt. When the CPU executes the routine shown in FIGS. 9A and 9B at this time, the determination in step 325 is "Yes" so the CPU proceeds on to step 930 where it sets the value of the feedback allowed flag XFB to "1". In this way the control quickly brings the actual argon flow rate Aract close to the required argon amount Artgt after a sudden change.

Figure 10:
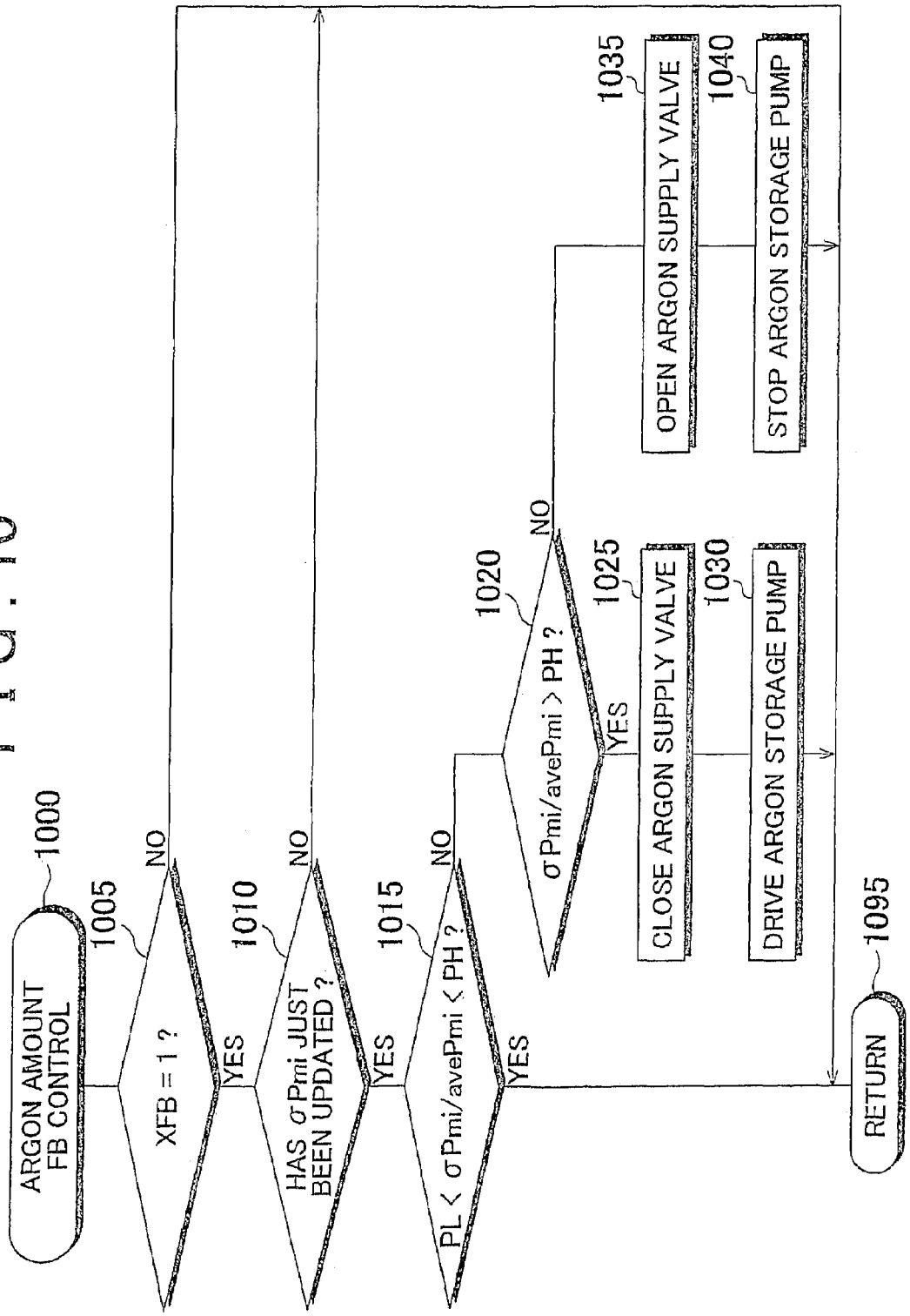
FIG. 10 is a flowchart illustrating another routine executed by the CPU of the internal combustion engine according to the second example embodiment of the invention.

Meanwhile, the CPU repeatedly executes an argon amount feedback control routine shown in the flowchart of FIG. 10 at predetermined intervals of time. Accordingly, at a predetermined timing, the CPU starts the routine from step 1000 and then determines in step 1005 whether the value of the feedback allowed flag XFB is "1".

If the value of the feedback allowed flag XFB is "0" at this time, the determination in step 1005 is "No" so the CPU proceeds directly on to step 1095 where it ends this cycle of the routine. That is, when the value of the feedback allowed flag XFB is "0", the CPU does not perform feedback control on the argon amount.

If, on the other hand, the value of the feedback allowed flag XFB is set to "1" in step 930 in FIGS. 9A and 9B described above, the determination in step 1005 is "Yes" so the CPU proceeds on to step 1010 where it determines whether an accumulated value σPmi of the indicated mean effective pressure change width has just been updated. As will be described later, when the internal combustion engine has been operating stably for a predetermined period of time (i.e., when the required torque tqtgt has not changed for a predetermined period of time), the accumulated value σPmi of the indicated mean effective pressure change width is updated.

The following description is based on the assumption that the accumulated value σPmi of the indicated mean effective pressure change width has just been updated. Therefore, the determination in step 1010 is "Yes" so the CPU proceeds on to step 1015 where it determines whether the indicated mean effective pressure change rate (σPmi/avePmi) is larger than the value PL described above, which is the low side threshold value, and smaller than the value PH described above, which is the high side threshold value. That is, the CPU determines whether the indicated mean effective pressure change rate (σPmi/avePmi) is within the range between the low side threshold value PL and the high side threshold value PH. If the indicated mean effective pressure change rate (σPmi/avePmi) is within the range between the low side threshold value PL and the high side threshold value PH, the determination in step 1015 is "Yes" so the CPU proceeds on to step 1095 where it ends this cycle of the routine.

If, on the other hand, the indicated mean effective pressure change rate (σPmi/avePmi) is not within the range between the low side threshold value PL and the high side threshold value PH, then the determination in step 1015 is "No" so the CPU proceeds on to step 1020 where it determines whether the indicated mean effective pressure change rate (σPmi/avePmi) is greater than the high side threshold value PH. If the indicated mean effective pressure change rate (σPmi/avePmi) is greater than the high side threshold value PH, it means that the argon amount (i.e., the argon concentration) is excessively large and combustion has become unstable to an unacceptable level. Therefore, in this case the determination in step 1020 is "Yes" so the CPU proceeds on to step 1025 where it closes the argon supply valve 76. The CPU then continues on to step 1030 where it drives the argon storage pump 73. The CPU then proceeds on to step 1095 where it ends this cycle of the routine. Accordingly, some of the argon flowing through the second passage 62 is stored in the argon storage tank 71 which reduces the amount of argon supplied to the combustion chamber 21 (i.e., the argon concentration of the mixture is reduced).

If, on the other hand, it is determined in step 1020 that the indicated mean effective pressure change rate (σPmi/avePmi) is equal to or less than the high side threshold value PH, it means that even if the argon amount (i.e., argon concentration) increases, combustion will not become unstable to an unacceptable level and the thermal efficiency can be improved. Therefore, in this case the determination in step 1020 is "No" so the CPU proceeds on to step 1035 where it opens the argon supply valve 76. The CPU then proceeds on to step 1040 where it stops driving the argon storage pump 73. Then the CPU proceeds on to step 1095 where it ends this cycle of the routine. Accordingly, argon is supplied from the argon storage tank 71 to the second passage 62 so the argon concentration of the mixture increases. According to this routine, therefore, feedback control is performed on the argon concentration so that it becomes the maximum value within a range in which combustion will not become unstable (i.e., with the indicated mean effective pressure change rate (σPmi/avePmi) being in a range between the low side threshold value and the high side threshold value).

When there is no sudden change in the required torque tqtgt in a state in which, after a sudden change in the required torque tqtgt, the actual argon flow rate Aract came to match the required argon amount Artgt so the feedback allowed flag XFB was set to "1" in step 930 in FIGS. 9A and 9B in the last cycle of the routine, the determination in both step 910 and step 925 in the current cycle of the routine is "No" so the CPU proceeds directly on to step 995. Accordingly, in this case, open loop control (i.e., feedforward control) on the argon amount is not executed.

Also, when the CPU executes step 1010 in FIG. 10 at a timing other than immediately after the accumulated value σPmi of the indicated mean effective pressure change width was updated, the determination in that step 1010 is "No" so the CPU proceeds directly on to step 1095. Accordingly, feedback control of the argon amount is executed every time the accumulated value σPmi of the indicated mean effective pressure change width is updated.

Figure 11:
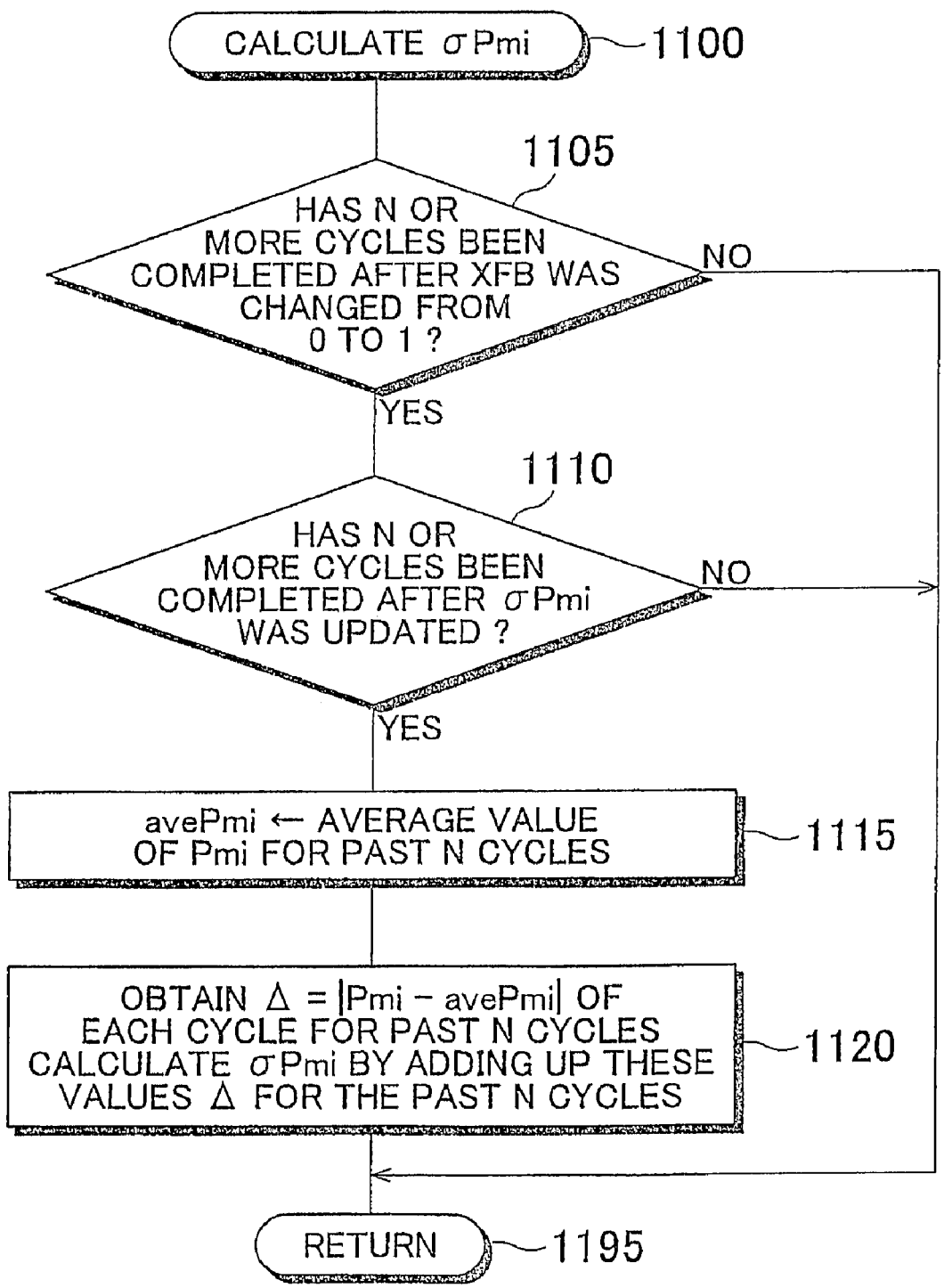
FIG. 11 is a flowchart illustrating still another routine executed by the CPU of the internal combustion engine according to the second example embodiment of the invention.

Moreover, in order to calculate the indicated mean effective pressure change rate (σPmi/avePmi) the CPU repeatedly executes a routine shown in the flowchart in FIG. 11 at predetermined intervals of time. Therefore, at a predetermined timing, the CPU starts the routine from step 1100 after which it determines in step S1105 whether N or more cycles have been completed after the value of the feedback allowed flag XFB changed from "0" to "1" (i.e., whether the internal combustion engine has rotated 2×N or more times). At this time, if N or more cycles have not been completed after the value of the feedback allowed flag XFB changed from "0" to "1", then the determination in step 1105 is "No" so the CPU proceeds on to step S1195 where it ends this cycle of the routine. Accordingly, in this case, the accumulated value σPmi of the indicated mean effective pressure change width is not updated.

If, on the other hand, N or more cycles have been completed after the value of the feedback allowed flag XFB changed from "0" to "1", then the determination in step 1105 is "Yes" so the CPU proceeds on to step 1110 where it determines whether N or more cycles have been completed since the accumulated value σPmi of the indicated mean effective pressure change width was last updated. If at this time N or more cycles have not been completed since the accumulated value σPmi of the indicated mean effective pressure change width was last updated, the determination in step 1110 is "No" so the CPU proceeds directly on to step 1195 where it ends this cycle of the routine. Accordingly, the accumulated value σPmi of the indicated mean effective pressure change width is not updated.

Supposing now that N or more cycles have been completed since the accumulated value σPmi of the indicated mean effective pressure change width was last updated, the determination in step 1110 is "Yes" so the CPU proceeds on to step 1115 where it calculates the average value of the indicated mean effective pressure Pmi for the past N cycles as the indicated mean effective pressure average value avePmi. The indicated mean effective pressure Pmi of each cycle is calculated separately based on the in-cylinder pressure Pcy detected by the in-cylinder pressure sensor 83 and the crank angle detected by the engine speed sensor 82 according to a routine which is not shown, and then stored in RAM.

Next, the CPU proceeds on to step 1120 where it obtains the absolute values of the difference between the indicated mean effective pressure Pmi for each cycle for the past N cycles and the indicated mean effective pressure average value avePmi for those past N cycles, accumulates those absolute values over the past N cycles, and makes that accumulated value the accumulated value σPmi of the indicated mean effective pressure change width. The CPU then proceeds on to step 1195 where it ends this cycle of the routine. Accordingly, the indicated mean effective pressure average value avePmi and the accumulated value σPmi of the indicated mean effective pressure change width are calculated.

Because of step 1105, the accumulated value σPmi of the indicated mean effective pressure change width is not updated until N cycles have been completed after the feedback allowed flag changed from "0" to "1". Therefore, at this time the feedback control of the argon amount according to steps 1015 through 1040 in FIG. 10 is not executed. This is because after a sudden change in the required torque tqtgt, it is necessary to reobtain the indicated mean effective pressure average value avePmi and the accumulated value σPmi of the indicated mean effective pressure change width, i.e., to reobtain the indicated mean effective pressure change ratio (σPmi/avePmi) which is the combustion state index value, after the actual argon amount Aract comes to substantially match the required argon amount Artgt that is based on the required torque after the sudden change, according to open loop control.

As described above, the internal combustion engine according to the second example embodiment is an operating gas circulation type internal combustion engine similar to that of the first example embodiment, which includes combustion state index value obtaining means (i.e., the in-cylinder pressure sensor 83 and the electric control unit 80 that executes the routine shown in FIG. 11) for obtaining a combustion state index value which is a value indicative of the combustion state of the internal combustion engine, and operating gas amount regulating means (i.e., the argon supply amount regulating portion 70 and the electronic control unit 80 that executes the routine shown in FIG. 10) for regulating the amount of operating gas supplied to the combustion chamber based on the obtained combustion state index value.

Therefore, the internal combustion engine according to the second example embodiment can change the operating gas amount (i.e., the argon gas amount) which affects the combustion state according to the actual combustion state. As a result, the argon concentration can be changed within a range in which the actual combustion state will not deteriorate to an unacceptable level so the internal combustion engine can operate at substantially maximum thermal efficiency without the combustion state deteriorating excessively. By setting the feedback control range of the argon concentration to a range in which a more stable combustion state can be obtained (i.e., by performing feedback control on the argon amount so that the indicated mean effective pressure change rate (σPmi/avePmi) is within a range between the value DL and a value less than the value DL, for example), a good combustion state can be maintained while maintaining a relatively high thermal efficiency.

An internal combustion engine according to a first modified example of the second example embodiment differs from the internal combustion engine of the second example embodiment only in that the CPU executes an argon amount feedback control routine shown in the flowchart in FIG. 12, instead of the routine shown in FIG. 10, at predetermined intervals of time. Therefore, the following description will focus on this difference. Steps in FIG. 12 that are the same as those in FIG. 10 will be denoted by the same reference numerals.

According to the routine shown in FIG. 12 as well, feedback control is performed on the argon amount only in a case in which the determinations in steps 1005 and 1010 are "Yes" and the CPU has proceeded on to step 1205 and thereafter. More specifically, in step 1205 the CPU determines whether the indicated mean effective pressure change rate (σPmi/avePmi) is less than the low side threshold value PL. If the indicated mean effective pressure change rate (σPmi/avePmi) is less than the low side threshold value PL, then the CPU proceeds on to steps 1035 and 1040 where it increases the argon amount supplied to the combustion chamber 21 (i.e., increases the argon concentration in the mixture).

If, on the other hand, it is determined in step 1205 that the indicated mean effective pressure change rate (σPmi/avePmi) is equal to or greater than the low side threshold value PL, then the determination in step 1205 is "No" so the CPU proceeds on to step 1020 where it determines whether the indicated mean effective pressure change rate (σPmi/avePmi), is greater than the high side threshold value PH. If the indicated mean effective pressure change rate (σPmi/avePmi) is greater than the high side threshold value PH, then the determination in step 1020 is "Yes" so the CPU proceeds on to steps 1025 and 1030 where it reduces the argon amount supplied to the combustion chamber 21 (i.e., reduces the argon concentration in the mixture).

As a result, the argon concentration is controlled to within a range where it is greater than the value DL but less than the value DH shown in FIG. 8. Accordingly, the combustion state will not become unstable and the thermal efficiency can be maintained at an extremely high value.

According to a second modified example of the second example embodiment, the CPU executes a routine that includes only steps 305 through 315 in FIGS. 9A and 9B instead of the entire routine in FIGS. 9A and 9B, as well as executes the routine in FIG. 10 but with step 1005 omitted, instead of the entire routine in FIG. 10. Accordingly, the open loop control is omitted. Similarly, the CPU may also execute a routine that includes only steps 305 through 315 in FIGS. 9A and 9B instead of the entire routine in FIGS. 9A and 9B, as well as execute the routine in FIG. 12 but with step 1005 omitted, instead of the entire routine in FIG. 12. In this case as well the open loop control is omitted.

Next, an internal combustion engine according to a third example embodiment of the invention will be described. This internal combustion engine differs from the internal combustion engine according to the second example embodiment in that it uses as the combustion state index value an engine speed change rate (σNE/aveNE) instead of the indicated mean effective pressure change rate (σPmi/avePmi) used by the internal combustion engine according to the second example embodiment. Therefore, the following description will focus on this difference.

The engine speed change rate (σNE/aveNE) is the quotient (σNE/aveNE) of a value σNE which is the sum of the accumulated absolute values of the difference between an average value aveNE of the engine speed at a predetermined timing (past N cycle) and an instantaneous value NE of the engine speed with respect to a predetermined crank angle amount at that timing (e.g., a crank angle of 720 degrees corresponding to one cycle of the engine) (hereinafter that value σNE will be referred to as "engine speed change width accumulated value σNE"), divided by the average value aveNE of the engine speed. If the combustion state deteriorates, the change width of the engine speed NE increases so the engine speed change rate (σNE/aveNE) increases uniformly as the combustion state deteriorates. That is, the engine speed change rate (σNE/aveNE) changes according to the combustion state, similar to the indicated mean effective pressure change rate (σPmi/avePmi).

The combustion state index value may also use the reciprocal (aveNE/σNE) of the engine speed change rate described above. In this case, if the combustion state deteriorates, the width of the change in the engine speed NE increases. Accordingly, the reciprocal of the engine speed change rate (avePmi/σNE) decreases uniformly as the combustion state deteriorates.

Figure 13:
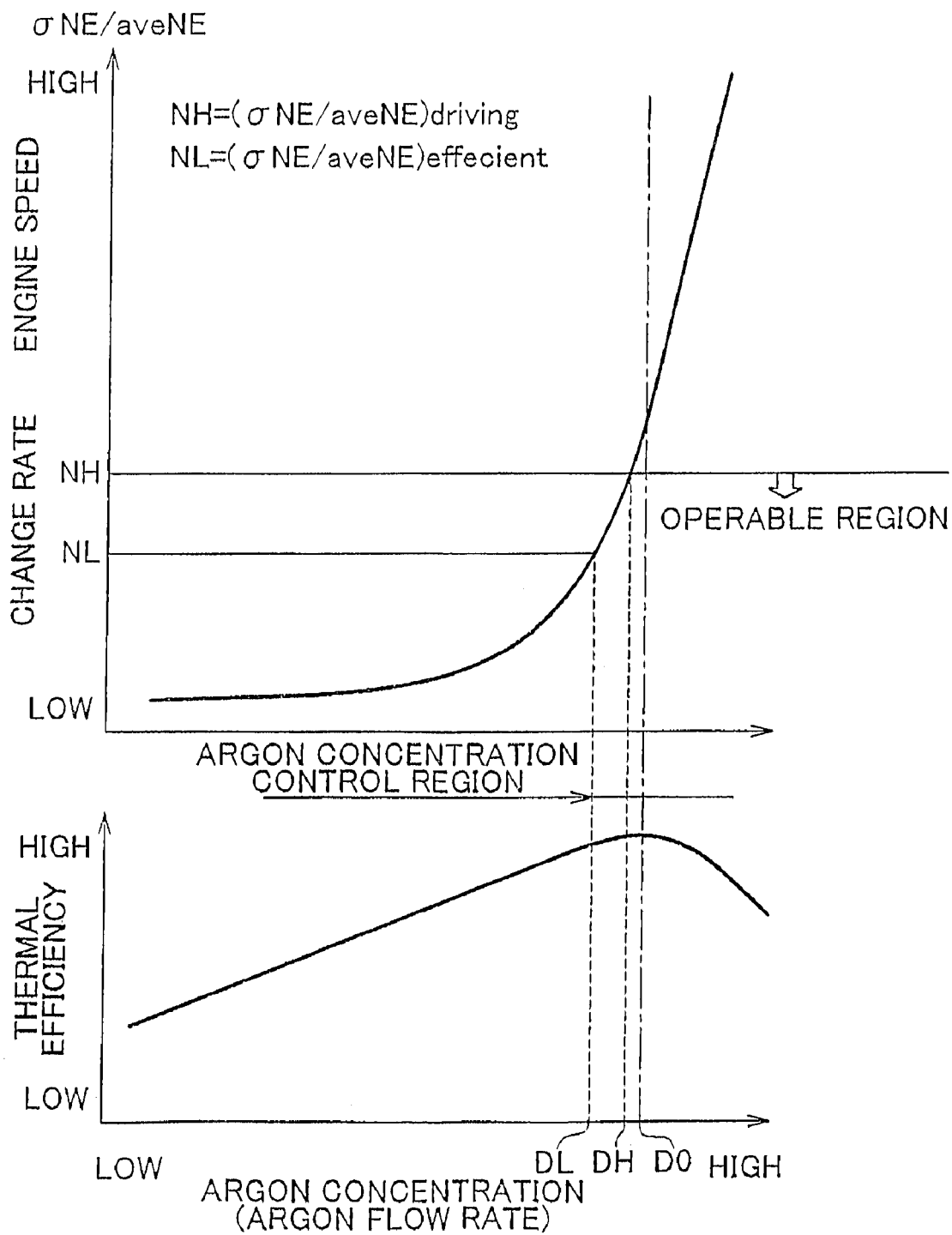
FIG. 13 is a graph illustrating the operation of an internal combustion engine according to a third example embodiment of the invention.

FIG. 13 is a graph showing the manner of change in the thermal efficiency of the internal combustion engine 10 and the engine speed change rate (σNE/aveNE) with respect to the argon concentration of the mixed gas when the amounts of the oxygen and hydrogen supplied to the combustion chamber 21 are maintained at predetermined values. As is evident when comparing the graph of FIG. 13 with the graph of FIG. 8, the argon concentration can be controlled to a value between the value DL and the value DH even if the engine speed change rate (σNE/aveNE) is used instead of the indicated mean effective pressure change rate (σPmi/avePmi) as the combustion state index value.

More specifically, the engine speed change rate (σNE/aveNE) when the argon concentration is the value DH is a value NH (=(σNE/aveNE) driving, high side threshold value), and the engine speed change rate (σNE/aveNE) when the argon concentration is the value DL is a value NL (=(σNE/aveNE) efficient, low side threshold value). Accordingly, this internal combustion engine controls the argon supply amount such that the engine speed change rate (σNE/aveNE) is between the value NL and the value NH and the argon concentration is at its maximum (i.e., such that the engine speed change rate (σNE/aveNE) comes as close as possible to the value NH). Therefore, this internal combustion engine can be operated at extremely high efficiency without the combustion state deteriorating excessively.

Figure 14:
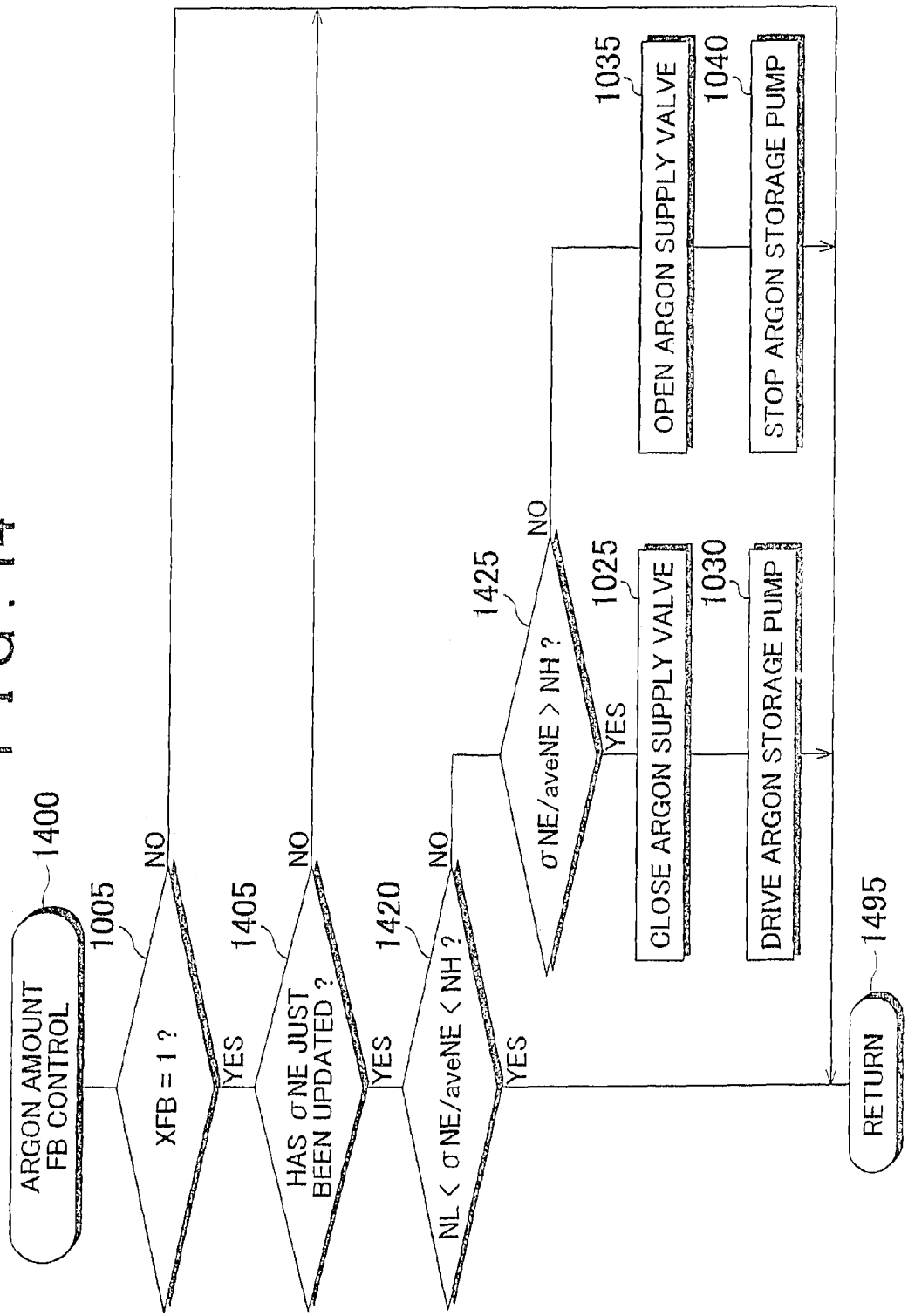
FIG. 14 is a flowchart illustrating a routine executed by a CPU of the internal combustion engine according to the third example embodiment of the invention.
Figure 15:
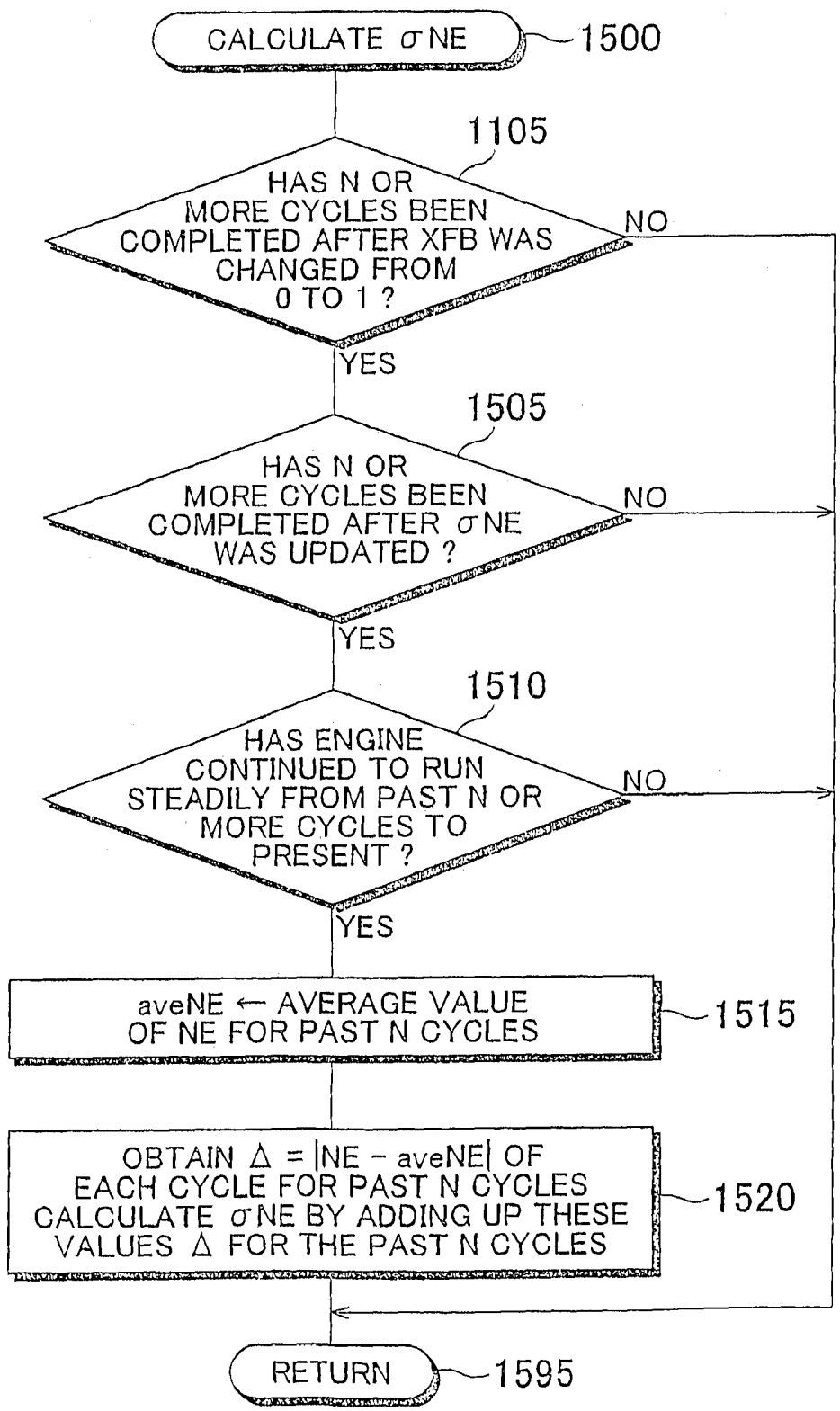
FIG. 15 is a flowchart illustrating another routine executed by the CPU of the internal combustion engine according to the third example embodiment of the invention.

This internal combustion engine differs from the internal combustion engine of the second example embodiment only in that the CPU executes the routines shown in FIGS. 14 and 15 instead of the routines shown in FIGS. 10 and 11, respectively. Therefore, the following description will focus on this difference. Steps in FIG. 14 that are the same as those in FIG. 10 will be denoted by the same reference numerals, and steps in FIG. 15 that are the same as those in FIG. 11 will be denoted by the same reference numerals.

As can be understood from a comparison of FIGS. 10 and 14, if the engine speed change rate (σNE/aveNE) is within a range between the low side threshold value NL and the high side threshold value NH, the determination in step 1420 is "Yes" so the CPU of this internal combustion engine proceeds directly on to step 1495 where it ends this cycle of the routine. Therefore, in this case the argon amount (i.e., the argon concentration) does not change.

If the engine speed change rate (σNE/aveNE) is greater than the high side threshold value NH when the engine speed change rate (σNE/aveNE) is within the range between the low side threshold value NL and the high side threshold value NH, then the CPU proceeds on to steps 1025 and 1030 where it reduces the argon amount supplied to the combustion chamber 21 (i.e., reduces the argon concentration in the mixture). If, on the other hand, the engine speed change rate (σNE/aveNE) is not within the range between the low side threshold value NL and the high side threshold value NH and is equal to or less than the high side threshold value NH, then the CPU proceeds on to steps 1035 and 1040 where it increases the argon amount supplied to the combustion chamber 21 (i.e., increases the argon concentration in the mixture).

Moreover, as is evident by comparing FIGS. 11 and 15, the CPU of this internal combustion engine calculates the engine speed average value aveNE in step 1515 and calculating the engine speed change width accumulated value σNE in step 1520 only when all of the following three conditions have been satisfied.

(First condition) N or more cycles have been completed after the value of the feedback allowed flag XFB has changed from "0" to "1" (step 1105). (Second condition) N or more cycles have been completed after the engine speed change width accumulated value σNE was last updated (step 1505).

(Third condition) The internal combustion engine has continued to operate steadily from the past N or more cycles to present (step 1510). That is, for example, the maximum value of the absolute value of a change rate (dAccp/dt) of the accelerator pedal operating amount Accp in a period of time from the past N cycles to present is equal to or less than a predetermined value, and the maximum value of the absolute value of the change amount (dNE/dt) of the engine speed NE is equal to or less than a predetermined value. The third condition (step 1510) is a condition provided to eliminate the change in the engine speed NE that is based on an operation by the driver from the engine speed change width accumulated value σNE in order to reflect only the effect that the argon concentration has on the combustion state in the engine speed change rate (σNE/aveNE). This third condition is not absolutely necessary.

Accordingly, the CPU performs feedback control on the argon concentration so that the argon concentration becomes the maximum value within a range where combustion will not become unstable (i.e., where the engine speed change rate (σNE/aveNE) is within the range between the low side threshold value NL and the high side threshold value NH). As a result, the internal combustion engine can operate at substantially maximum thermal efficiency in a range where the actual combustion state will not deteriorate to an unacceptable level.

Just like the relationship between the second example embodiment and the first modified example of the second example embodiment, in the third example embodiment as well, the argon concentration may also be controlled so that the engine speed change rate (σNE/aveNE) is maintained within the range between the low side threshold value NL and the high side threshold value NH by executing the routine shown in the flowchart in FIG. 16 instead of the routine shown in FIG. 14.

The feedback control range of the argon concentration may also be set to a range in which more stable combustion can be achieved. That is, the argon concentration may also be controlled so that the engine speed change rate (σNE/aveNE) falls in a range between the low side threshold value NL and a value less than the low side threshold value NL for example. Accordingly, a better combustion state can be maintained while maintaining a relatively high thermal efficiency.

As described above, the various example embodiments of the internal combustion engine according to the invention can control the argon concentration of the mixture (i.e., the amount of argon supplied to the combustion chamber 21) according to the required torque and the combustion state, thereby enabling the engine to operate with high thermal efficiency. The invention is not limited to the foregoing example embodiments, however. To the contrary, various modifications and equivalent arrangements are also within the scope of the invention. For example, the invention may also of course be applied to a diesel engine that burns hydrogen gas through diffusion combustion.

The invention claimed is:

1. An internal combustion engine comprising:
   a combustion chamber for generating power by combusting hydrogen and expanding an operating gas that is an inert gas having a larger specific heat ratio than oxygen using heat generated by the combustion;
   an apparatus that supplies the operating gas in post-combustion gas discharged form the combustion chamber to the combustion chamber again;
   a hydrogen and oxygen supply apparatus that determines an amount of hydrogen and an amount of oxygen to be supplied to the combustion chamber such that the internal combustion engine generates torque of a magnitude corresponding to a required torque, which is the torque required of the internal combustion engine, and supplies the determined amount of hydrogen and the determined amount of oxygen to the combustion chamber; and
   an operating gas amount regulating apparatus that determines an amount of operating gas to be supplied to the combustion chamber according to the required torque, and regulates the amount of operating gas supplied to the combustion chamber such that the determined amount of operating gas is supplied to the combustion chamber.

2. The internal combustion engine according to claim 1, further comprising:
   combustion state index value obtaining means for obtaining a combustion state index value that is a value indicative of a combustion state of the internal combustion engine, wherein
   the operating gas amount regulating means regulates the amount of operating gas supplied to the combustion chamber based on the obtained combustion state index value.

3. An internal combustion engine comprising:
   a combustion chamber for generating power by combusting hydrogen and expanding an operating gas that is an inert gas having a larger specific heat ratio than oxygen using heat generated by the combustion;
   an operating gas supply apparatus that supplies the operating gas in post-combustion gas discharged form the combustion chamber to the combustion chamber again;
   a hydrogen supply apparatus that determines an amount of hydrogen to be supplied to the combustion chamber based on a required torque, which is the torque required of the internal combustion engine, and supplies the determined amount of hydrogen to the combustion chamber;
   an oxygen supply apparatus that determines an amount of oxygen to be supplied to the combustion chamber based on the determined amount of hydrogen, and supplies the determined amount of oxygen to the combustion chamber; and
   an operating gas amount regulating apparatus that determines an amount of operating gas to be supplied to the combustion chamber according to the required torque, and regulates the amount of operating gas supplied to the combustion chamber such that the determined amount of operating gas is supplied to the combustion chamber.

4. The internal combustion engine according to claim 3, further comprising:
   combustion state index value obtaining means for obtaining a combustion state index value that is a value indicative of a combustion state of the internal combustion engine, wherein
   the operating gas amount regulating means regulates the amount of operating gas supplied to the combustion chamber based on the obtained combustion state index value.

5. An internal combustion engine comprising:
   a combustion chamber into which hydrogen, oxygen, and an operating gas that is an inert gas having a larger specific heat ratio than oxygen is supplied, and that generates power by expanding the operating gas using heat generated by the combustion;
   an operating gas supply apparatus that supplies the operating gas in post-combustion gas discharged from the combustion chamber to the combustion chamber again;
   a combustion state index value obtaining apparatus that obtains a combustion state index value which is a value indicative of a combustion state of the internal combustion engine; and
   an operating gas amount regulating apparatus that regulates the amount of operating gas supplied to the combustion chamber based on the obtained combustion state index value.

6. The internal combustion engine according to claim 5, further comprising:
   hydrogen supplying means for determining an amount of hydrogen to be supplied to the combustion chamber based on a required torque, which is the torque required of the internal combustion engine, and supplying the determined amount of hydrogen to the combustion chamber; and
   oxygen supplying means for determining an amount of oxygen to be supplied to the combustion chamber based on the determined amount of hydrogen, and supplying the determined amount of oxygen to the combustion chamber.

7. The internal combustion engine according to claim 5, wherein the combustion state index value obtaining means obtains, as the combustion state index value, a value that uniformly increases or uniformly decreases as the combustion state of the internal combustion engine deteriorates; and the operating gas amount regulating means regulates the operating gas amount such that the operating gas amount supplied to the combustion chamber becomes the maximum amount within a range in which the obtained combustion state index value becomes a value indicative of a better operating state than an allowable predetermined limit combustion state.

8. The internal combustion engine according to claim 5, wherein the combustion state index value obtaining means obtains, as the combustion state index value, a value that uniformly increases or uniformly decreases as the combustion state of the internal combustion engine deteriorates; and the operating gas amount regulating means regulates the operating gas amount supplied to the combustion chamber such that the obtained combustion state index value falls within a predetermined range.

9. The internal combustion engine according to claim 5, wherein the combustion state index value is the quotient of the sum of accumulated absolute values of the difference between an average value of an indicated mean effective pressure and each indicated mean effective pressure, divided by the average value of the indicated mean effective pressure.

10. The internal combustion engine according to claim 5, wherein the combustion state index value is the quotient of an average value of an indicated mean effective pressure divided by the sum of accumulated absolute values of the difference between the average value of the indicated mean effective pressure and each indicated mean effective pressure.

11. The internal combustion engine according to claim 5, wherein the combustion state index value is the quotient of the sum of accumulated absolute values of the difference between an average value of an engine speed during a predetermined period and an instantaneous value of the engine speed with respect to a predetermined crank angle amount during the predetermined period, divided by the average value of the engine speed.

12. The internal combustion engine according to claim 5, wherein the combustion state index value is the quotient of an average value of an engine speed divided by the sum of accumulated absolute values of the difference between the average value of the engine speed during a predetermined period and an instantaneous value of the engine speed with respect to a predetermined crank angle amount during the predetermined period.

13. A control method for an operating gas circulation type internal combustion engine that generates power by combusting hydrogen in a combustion chamber of the internal combustion engine and expanding an operating gas, which is an inert gas having a larger specific heat ratio than oxygen, using heat generated by the combustion, and supplies operating gas in post-combustion gas discharged from the combustion chamber to the combustion chamber again, comprising:

determining a required torque, which is the torque required of the internal combustion engine;

determining an amount of hydrogen and an amount of oxygen to be supplied to the combustion chamber based on the required torque;

supplying the determined amount of hydrogen and the determined amount of oxygen to the combustion chamber;

determining an amount of operating gas to be supplied to the combustion chamber according to the required torque; and regulating the amount of operating gas supplied to the combustion chamber such that the determined amount of operating gas is supplied to the combustion chamber.

14. A control method for an operating gas circulation type internal combustion engine that generates power by combusting hydrogen in a combustion chamber of the internal combustion engine and expanding an operating gas, which is an inert gas having a larger specific heat ratio than oxygen, using heat generated by the combustion, and supplies operating gas in post-combustion gas discharged from the combustion chamber to the combustion chamber again, comprising:

determining a required torque, which is the torque required of the internal combustion engine;

determining an amount of hydrogen to be supplied to the combustion chamber based on the required torque;

supplying the determined amount of hydrogen to the combustion chamber;

determining an amount of oxygen to be supplied to the combustion chamber based on the determined amount of hydrogen;

supplying the determined amount of oxygen to the combustion chamber;

determining an amount of operating gas to be supplied to the combustion chamber based on the required torque; and regulating the amount of operating gas supplied to the combustion chamber such that the determined amount of operating gas is supplied to the combustion chamber.

15. A control method for an operating gas circulation type internal combustion engine that generates power by supplying hydrogen, oxygen, and an operating gas, which is an inert gas having a larger specific heat ratio than oxygen, to a combustion chamber of the internal combustion engine and expanding the operating gas using heat generated by the combustion, and supplies operating gas in post-combustion gas discharged from the combustion chamber to the combustion chamber again, comprising:

obtaining a combustion state index value, which is a value indicative of a combustion state of the internal combustion engine; and regulating an amount of operating gas supplied to the combustion chamber based on the obtained combustion state index value.

* * * * *